(12) United States Patent
Chen et al.

(10) Patent No.: US 11,570,081 B2
(45) Date of Patent: Jan. 31, 2023

(54) MULTI-MEMBER BLUETOOTH DEVICE CAPABLE OF DYNAMICALLY SWITCHING OPERATION MODE

(71) Applicant: Realtek Semiconductor Corp., Hsinchu (TW)

(72) Inventors: Yi-Cheng Chen, Hsinchu (TW); Kuan-Chung Huang, Hsinchu (TW); Chia Chun Hung, Hsinchu (TW); Hou Wei Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 84 days.

(21) Appl. No.: 17/026,448

(22) Filed: Sep. 21, 2020

(65) Prior Publication Data

US 2021/0105200 A1    Apr. 8, 2021

Related U.S. Application Data

(60) Provisional application No. 62/909,783, filed on Oct. 3, 2019.

(30) Foreign Application Priority Data

Aug. 11, 2020    (TW) .................................. 109127186

(51) Int. Cl.
*H04L 43/12* (2022.01)
*H04L 43/18* (2022.01)
(Continued)

(52) U.S. Cl.
CPC .............. *H04L 43/12* (2013.01); *H04L 43/18* (2013.01); *H04W 4/80* (2018.02); *H04W 84/18* (2013.01)

(58) Field of Classification Search
CPC ..... H04L 43/12; H04L 43/18; H04L 43/0888; H04L 43/16; H04W 4/80; H04W 84/18; H04B 5/0031
See application file for complete search history.

(56) References Cited

U.S. PATENT DOCUMENTS 10,187,179 B1 *   1/2019   Jorgovanovic ........ H04L 1/0026
10,581,998 B2     3/2020   Wang et al.
(Continued)

FOREIGN PATENT DOCUMENTS

| CN | 104320699 A | 1/2015 |
| CN | 104320843 A | 1/2015 |

(Continued)

OTHER PUBLICATIONS

Bluetooth Core Specification v5.1, Jan. 21, 2019, Bluetooth SIG.*
(Continued)

*Primary Examiner* — Jae Y Lee
(74) *Attorney, Agent, or Firm* — Birch, Stewart, Kolasch & Birch, LLP

(57) ABSTRACT

A multi-member Bluetooth device for communicating data with a remote Bluetooth device is disclosed including: a main Bluetooth circuit and an auxiliary Bluetooth circuit. In the period during which the auxiliary Bluetooth circuit operates at a sniffing mode, the auxiliary Bluetooth circuit sniffs packets transmitted from the remote Bluetooth device while the main Bluetooth circuit receives packets issued from the remote Bluetooth device, and the auxiliary Bluetooth circuit switches from the sniffing mode to a relay mode if the throughput of packets sniffed by the auxiliary Bluetooth circuit is lower than a predetermined threshold. In the period during which the auxiliary Bluetooth circuit operates at the relay mode, the main Bluetooth circuit receives packets transmitted from the remote Bluetooth device and forwards the received packets to the auxiliary (Continued)

Bluetooth circuit, and the auxiliary Bluetooth circuit does not sniff packets issued from the remote Bluetooth device.

9 Claims, 10 Drawing Sheets

(51) Int. Cl.
*H04W 4/80* (2018.01)
*H04W 84/18* (2009.01)

(56) References Cited

U.S. PATENT DOCUMENTS

| | | | |
|---|---|---|---|
| 2009/0213804 | A1 | 8/2009 | Yoon et al. |
| 2014/0269614 | A1 | 9/2014 | Maguire et al. |
| 2015/0124976 | A1 | 5/2015 | Pedersen et al. |
| 2015/0295982 | A1 | 10/2015 | Kafle et al. |
| 2017/0093613 | A1 | 3/2017 | Albrecht et al. |
| 2018/0077493 | A1 | 3/2018 | Watson et al. |
| 2018/0084456 | A1 | 3/2018 | Gostev et al. |
| 2018/0184234 | A1* | 6/2018 | Chen ............... H04W 76/14 |
| 2018/0234777 | A1 | 8/2018 | Roeck et al. |
| 2018/0317126 | A1 | 11/2018 | Wang et al. |
| 2018/0352047 | A1* | 12/2018 | Wang ............... H04W 4/80 |
| 2019/0174232 | A1* | 6/2019 | Tong ............... H04R 5/033 |
| 2019/0349682 | A1 | 11/2019 | Hsu |
| 2020/0053611 | A1* | 2/2020 | Jorgovanovic ....... H04W 36/03 |
| 2020/0107387 | A1* | 4/2020 | Li ............... H04B 17/318 |
| 2020/0252993 | A1* | 8/2020 | Srivastava ........ H04W 52/0274 |
| 2021/0303254 | A1* | 9/2021 | Wang ............... H04R 3/12 |

FOREIGN PATENT DOCUMENTS

| | | |
|---|---|---|
| CN | 137018484 A | 8/2017 |
| CN | 108040308 B | 7/2018 |
| CN | 108337595 A | 7/2018 |
| KR | 10-2009-0091634 A | 8/2009 |
| KR | 10-2015-0133777 A | 11/2015 |
| WO | WO 2013/032578 A1 | 3/2013 |

OTHER PUBLICATIONS

Taiwanese Office Action and Search Report for Taiwanese Application No. 109127186, dated Apr. 30, 2021, with partial English translation.
Korean Office Action for Korean Application No. 10-2020-0127514, dated Jun. 29, 2021, with English translation.
Japanese Notification of Reasons for Refusal for Japanese Application No. 2020-164032, dated Oct. 12, 2021, with an English translation.
Japanese Notification of Reasons for Refusal for Japanese Application No. 2020-164046, dated Oct. 12, 2021, with an English translation.
Taiwanese Office Action and Search Report for Taiwanese Application No. 109127807, dated May 21, 2021, with partial English translation.
Taiwanese Notice of Allowance for Taiwanese Application No. 109127186, dated Jul. 30, 2021, with English translation.
Chinese Office Action and Search Report for Chinese Application No. 202010783866.X, dated May 19, 2021, with English translation.
Korean Office Action for Korean Application No. 10-2020-0127480, dated Jun. 7, 2021, with English translation.
Korean Office Action for Korean Application No. 10-2020-0127507, dated Jun. 7, 2021, with English translation.
Korean Office Action for Korean Application No. 10-2020-0127518, dated Jun. 7, 2021, with English translation.
Taiwanese Office Action and Search Report for Taiwanese Application No. 109127184, dated Jun. 16, 2021, with English translation.
Taiwanese Office Action and Search Report for Taiwanese Application No. 109127185, dated Jun. 16, 2021, with English translation.
Japanese Notification of Reasons for Refusal for Japanese Application No. 2020-163968, dated Aug. 31, 2021, with an English translation.
Korean Office Action for Korean Application No. 10-2020-0127510, dated Jan. 26, 2022, with English translation.
U.S. Office Action for U.S. Appl. No. 17/026,982, dated May 13, 2022.

* cited by examiner

MULTI-MEMBER BLUETOOTH DEVICE CAPABLE OF DYNAMICALLY SWITCHING OPERATION MODE

CROSS-REFERENCE TO RELATED APPLICATIONS

This application claims the benefit of priority to Patent Application No. 109127186, filed in Taiwan on Aug. 11, 2020; the entirety of which is incorporated herein by reference for all purposes.

This application claims the benefit of priority to U.S. Provisional Application Ser. No. 62/909,783, filed on Oct. 3, 2019; the entirety of which is incorporated herein by reference for all purposes.

BACKGROUND

The disclosure generally relates to a Bluetooth technology and, more particularly, to a multi-member Bluetooth device capable of dynamically switching operation modes.

A multi-member Bluetooth device is a Bluetooth device formed by multiple Bluetooth circuits cooperating with each other, such as a pair of Bluetooth earphones, a set of Bluetooth speakers, or the like. When the multi-member Bluetooth device connects to another Bluetooth device (hereinafter referred to as a remote Bluetooth device), the remote Bluetooth device treats the multi-member Bluetooth device as a single Bluetooth device. The conventional multi-member Bluetooth device configures one of member circuits to be a main Bluetooth circuit for conducting a bidirectional data transmission with the remote Bluetooth device, and configures other member circuits to be auxiliary Bluetooth circuits.

However, the wireless signal environment of Bluetooth communication changes with time, or changes under the influence of the user's posture or the user's usage habit. If the cooperation between the main Bluetooth circuit and the auxiliary Bluetooth circuit does not react to and dynamically adjust based on the current Bluetooth communication environment condition, the overall operating performance of the multi-member Bluetooth device would easily degrade, or it would reduce the standby time of the multi-member Bluetooth device.

SUMMARY

An example embodiment of a multi-member Bluetooth device utilized to operably conduct data transmission with a remote Bluetooth device is disclosed, the multi-member Bluetooth device comprising: a first Bluetooth communication circuit; a first packet parsing circuit, arranged to operably parse packets received by the first Bluetooth communication circuit; and a first control circuit, coupled with the first Bluetooth communication circuit and the first packet parsing circuit; and an auxiliary Bluetooth circuit, arranged to selectably operate at a sniffing mode or a relay mode, the auxiliary Bluetooth circuit comprising: a second Bluetooth communication circuit; a second packet parsing circuit, arranged to operably parse packets received by the second Bluetooth communication circuit; and a second control circuit, coupled with the second Bluetooth communication circuit and the second packet parsing circuit; wherein in a period during which the auxiliary Bluetooth circuit operates at the sniffing mode, the first control circuit utilizes the first Bluetooth communication circuit to receive packets transmitted from the remote Bluetooth device, and the second control circuit utilizes the second Bluetooth communication circuit to sniff packets issued from the remote Bluetooth device; in a situation of that a throughput of packets sniffed by of the auxiliary Bluetooth circuit is lower than a predetermined threshold, the auxiliary Bluetooth circuit switches from the sniffing mode to the relay mode; and in a period during which the auxiliary Bluetooth circuit operates at the relay mode, the second control circuit does not utilize the second Bluetooth communication circuit to sniff packets issued from the remote Bluetooth device, the first control circuit utilizes the first Bluetooth communication circuit to receive packets transmitted from the remote Bluetooth device, and utilizes the first Bluetooth communication circuit to forward received packets to the auxiliary Bluetooth circuit, and the second control circuit utilizes the second Bluetooth communication circuit to receive packets forwarded from the first Bluetooth communication circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
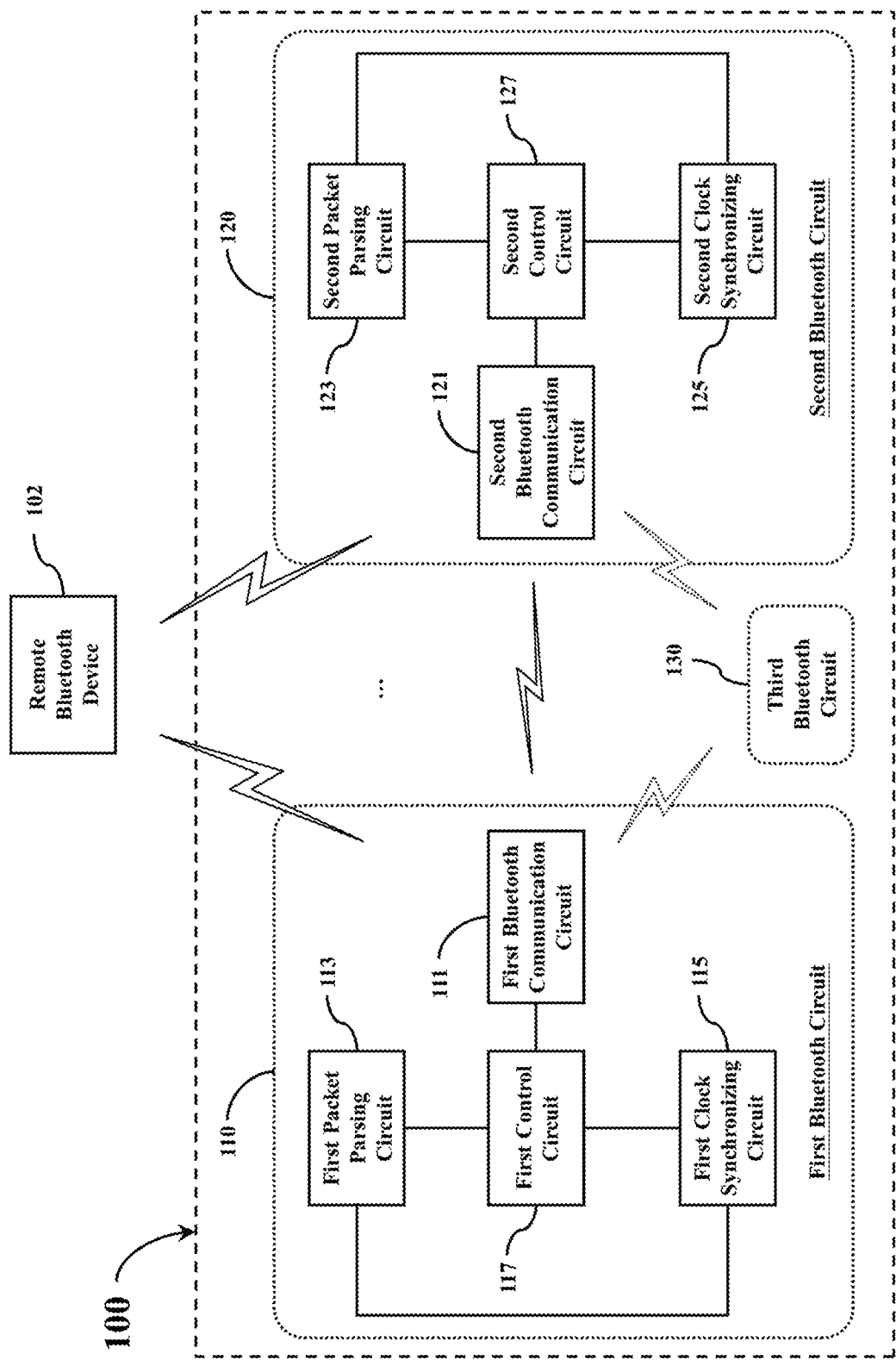
FIG. 1 shows a simplified functional block diagram of a multi-member Bluetooth device according to one embodiment of the present disclosure.

FIG. 1 shows a simplified functional block diagram of a multi-member Bluetooth device 100 according to one embodiment of the present disclosure. The multi-member Bluetooth device 100 is arranged to operably conduct data transmission with a remote Bluetooth device 102, and comprises multiple member circuits. For the convenience of description, only three member circuits are illustrated in the embodiment of FIG. 1, which respectively are a first Bluetooth circuit 110, a second Bluetooth circuit 120, and a third Bluetooth circuit 130.

In this embodiment, all member circuits of the multi-member Bluetooth device 100 have a similar main circuit structure, but different additional circuit components may be arranged in different member circuits, rather than restricting all member circuits to have an identical circuit structure. As shown in FIG. 1, for example, the first Bluetooth circuit 110 comprises a first Bluetooth communication circuit 111, a first packet parsing circuit 113, a first clock synchronizing circuit 115, and a first control circuit 117. Similarly, the second Bluetooth circuit 120 comprises a second Bluetooth communication circuit 121, a second packet parsing circuit 123, a second clock synchronizing circuit 125, and a second control circuit 127.

The main circuit components inside the third Bluetooth circuit 130 are similar to the situation of the aforementioned first Bluetooth circuit 110 and second Bluetooth circuit 120. For the sake of brevity, the interior circuit components of the third Bluetooth circuit 130 are not shown in FIG. 1.

In the first Bluetooth circuit 110, the first Bluetooth communication circuit 111 is arranged to operably conduct data communication with other Bluetooth devices. The first packet parsing circuit 113 is arranged to operably parse packets received by the first Bluetooth communication circuit 111. The first clock synchronizing circuit 115 is coupled with the first packet parsing circuit 113, and arranged to operably adjust a clock signal adopted by the first Bluetooth circuit 110 so as to synchronize a piconet clock adopted by the first Bluetooth circuit 110 and other Bluetooth devices.

The first control circuit 117 is coupled with the first Bluetooth communication circuit 111, the first packet parsing circuit 113, and the first clock synchronizing circuit 115, and is arranged to operably control the operations of the aforementioned circuits. In operations, the first control circuit 117 may directly conduct data communication with the remote Bluetooth device 102 through the first Bluetooth communication circuit 111 by using a Bluetooth wireless transmission approach, and may conduct data communication with other member circuits through the first Bluetooth communication circuit 111. The first control circuit 117 may further utilize the first packet parsing circuit 113 to parse the packets received by the first Bluetooth communication circuit 111 so as to acquire related data or instructions.

In the second Bluetooth circuit 120, the second Bluetooth communication circuit 121 is arranged to operably conduct data communication with other Bluetooth devices. The second packet parsing circuit 123 is arranged to operably parse the packets received by the second Bluetooth communication circuit 121. The second clock synchronizing circuit 125 is coupled with the second packet parsing circuit 123, and arranged to operably adjust a clock signal adopted by the second Bluetooth circuit 120 so as to synchronize the piconet clock adopted by the second Bluetooth circuit 120 and other Bluetooth devices.

The second control circuit 127 is coupled with the second Bluetooth communication circuit 121, the second packet parsing circuit 123, and the second clock synchronizing circuit 125, and is arranged to operably control the operations of the aforementioned circuits. In operations, the second control circuit 127 may conduct data communication with other Bluetooth devices through the second Bluetooth communication circuit 121 by using the Bluetooth wireless transmission approach, and may conduct data communication with other member circuits through the second Bluetooth communication circuit 121. The second control circuit 127 may further utilize the second packet parsing circuit 123 to parse the packets received by the second Bluetooth communication circuit 121 so as to acquire related data or instructions.

In practice, each of the aforementioned first Bluetooth communication circuit 111 and second Bluetooth communication circuit 121 may be realized with appropriate wireless communication circuits supporting various versions of Bluetooth communication protocols. Each of the aforementioned first packet parsing circuit 113 and second packet parsing circuit 123 may be realized with various packet demodulating circuits, digital processing circuits, micro-processors, or ASICs (Application Specific Integrated Circuit). Each of the aforementioned first clock synchronizing circuit 115 and second clock synchronizing circuit 125 may be realized with various appropriate circuits capable of comparing and adjusting clock frequency and/or clock phase. Each of the aforementioned first control circuit 117 and second control circuit 127 may be realized with various micro-processors or digital signal processing circuits having appropriate computing capability.

In some embodiments, the first clock synchronizing circuit 115 and the second clock synchronizing circuit 125 may be respectively integrated into the first control circuit 117 and the second control circuit 127. In addition, the aforementioned first packet parsing circuit 113 and second packet parsing circuit 123 may be respectively integrated into the aforementioned first Bluetooth communication circuit 111 and second Bluetooth communication circuit 121.

In other words, the aforementioned first Bluetooth communication circuit 111 and first packet parsing circuit 113 may be realized with separate circuits, or may be realized with the same circuit. Similarly, the aforementioned second Bluetooth communication circuit 121 and second packet parsing circuit 123 may be realized with separate circuits, or may be realized with the same circuit.

In applications, different functional blocks of the aforementioned first Bluetooth circuit 110 may be integrated into a single circuit chip. For example, all functional blocks of the first Bluetooth circuit 110 may be integrated into a single Bluetooth controller IC. Similarly, all functional blocks of the second Bluetooth circuit 120 may be integrated into another single Bluetooth controller IC.

As can be appreciated from the foregoing descriptions, different member circuits of the multi-member Bluetooth device 100 may conduct data communication with one another through respective Bluetooth communication circuits, so as to form various types of data network or data link. When the multi-member Bluetooth device 100 conducts data communication with the remote Bluetooth device 102, the remote Bluetooth device 102 treats the multi-member Bluetooth device 100 as a single Bluetooth device, and the multiple member circuits of the multi-member Bluetooth device 100 would select one member circuit to act as a main Bluetooth circuit for handling major operation of receiving packets issued from the remote Bluetooth device 102, and other member circuits act as auxiliary Bluetooth circuits.

The main Bluetooth circuit may adopt various existing mechanisms to receive the packets issued from the remote Bluetooth device 102, and during the operation of the main Bluetooth circuit, the auxiliary Bluetooth circuit may acquire the packets issued from the remote Bluetooth device 102 by adopting appropriate mechanisms.

For example, in a period during which the main Bluetooth circuit receives the packets issued from the remote Bluetooth device 102, the auxiliary Bluetooth circuit may operate at a sniffing mode to actively sniff the packets issued from the remote Bluetooth device 102. Alternatively, the auxiliary Bluetooth circuit may operate at a relay mode to passively receive the packets forwarded from the main Bluetooth circuit after the packets issued from the remote Bluetooth device 102 are received by the main Bluetooth circuit, and does not actively sniff the packets issued from the remote Bluetooth device 102. Respective operations of the main Bluetooth circuit and the auxiliary Bluetooth circuit in the foregoing two situations will be described in detail in the following paragraphs.

Please note that two terms "main Bluetooth circuit" and "auxiliary Bluetooth circuit" used throughout the description and claims are merely for the purpose of distinguishing different approaches of receiving packets issued from the remote Bluetooth device 102 adopted by different member circuits, rather than indicating that the main Bluetooth circuit is required to have a specific level of control authority over other operational aspects of the auxiliary Bluetooth circuit.

In addition, during the operation of the multi-member Bluetooth device 100, the main Bluetooth circuit and the auxiliary Bluetooth circuit may dynamically exchange their roles. For example, the main Bluetooth circuit may intermittently evaluate its operating parameters such as a computing loading, a remaining power, a temperature and/or an operating environment, and hand over its role to another auxiliary Bluetooth circuit in the situation where the aforementioned operating parameters matches specific predetermined conditions.

For another example, the main Bluetooth circuit may intermittently compare the aforementioned operating parameters of the main Bluetooth circuit with the aforementioned operating parameters of other auxiliary Bluetooth circuits, and hand over the role of the main Bluetooth circuit to another auxiliary Bluetooth circuit in the situation where a difference between the operating parameters of the main Bluetooth circuit and the operating parameters of the auxiliary Bluetooth circuit exceeds a predetermined degree.

For another example, the main Bluetooth circuit may intermittently compare its Bluetooth packet loss rate with the Bluetooth packet loss rate of other auxiliary Bluetooth circuits, and hand over the role of the main Bluetooth circuit to another auxiliary Bluetooth circuit in the situation where another auxiliary Bluetooth circuits has a lower Bluetooth packet loss rate.

In practice, the main Bluetooth circuit may take the aforementioned various evaluation criteria into consideration to conduct a comprehensive evaluation so as to determine whether to hand over the role of the main Bluetooth circuit to another auxiliary Bluetooth circuit.

Alternatively, the auxiliary Bluetooth circuit may adopt various approaches to determine whether the main Bluetooth circuit is disabled or missing, and in the situation where the auxiliary Bluetooth circuit determines that the main Bluetooth circuit is disabled or missing, the auxiliary Bluetooth circuit may take over the role of the former main Bluetooth circuit to proactively act as a new main Bluetooth circuit.

As is well known in related art, in a period during which the multi-member Bluetooth device 100 conducts data communication with the remote Bluetooth device 102, the wireless signal environment of Bluetooth communication may change with time due to various factors, or may change under the influence of a user's posture or the user's usage habit. In the situation where the main Bluetooth circuit and the auxiliary Bluetooth circuit do not exchange their roles with each other, if the cooperation between the main Bluetooth circuit and the auxiliary Bluetooth circuit does not react to and dynamically adjust based on the current Bluetooth communication environment condition, an overall operating performance of the multi-member Bluetooth device 100 would easily degrade, or it would reduce the standby time of the main Bluetooth circuit or the auxiliary Bluetooth circuit. In some situations, the heat generated by the auxiliary Bluetooth circuit or the main Bluetooth circuit and the temperature thereof may increase as well, thereby reducing the service life of the auxiliary Bluetooth circuit or the main Bluetooth circuit, or reducing the comfort level in using the auxiliary Bluetooth circuit or the main Bluetooth circuit (since too much heat or high temperature might result in the user feeling uncomfortable).

Figure 2:
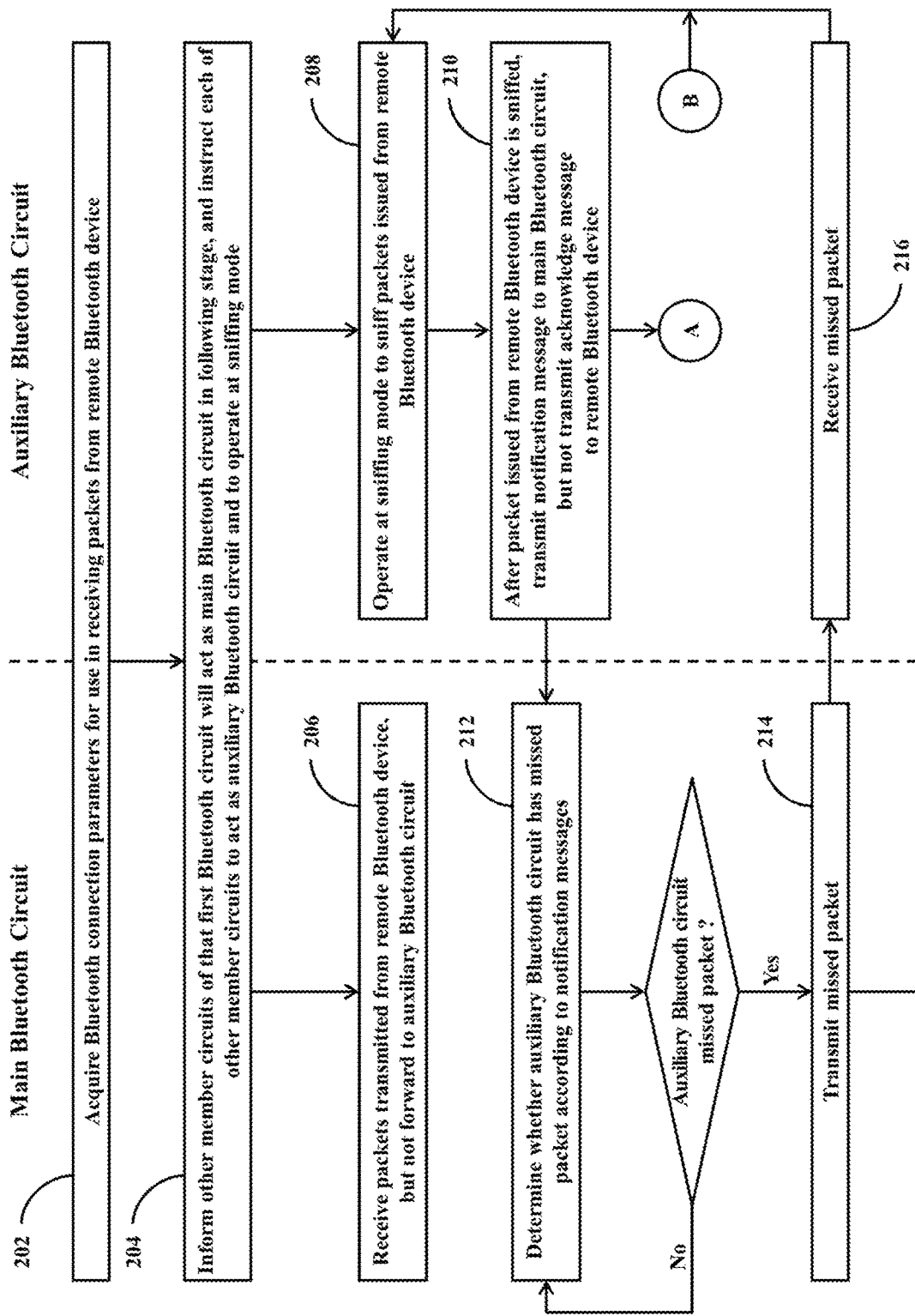
FIGS. 2~3 collectively show a simplified flowchart of an operation method of the multi-member Bluetooth device according to a first embodiment of the present disclosure.
Figure 3:
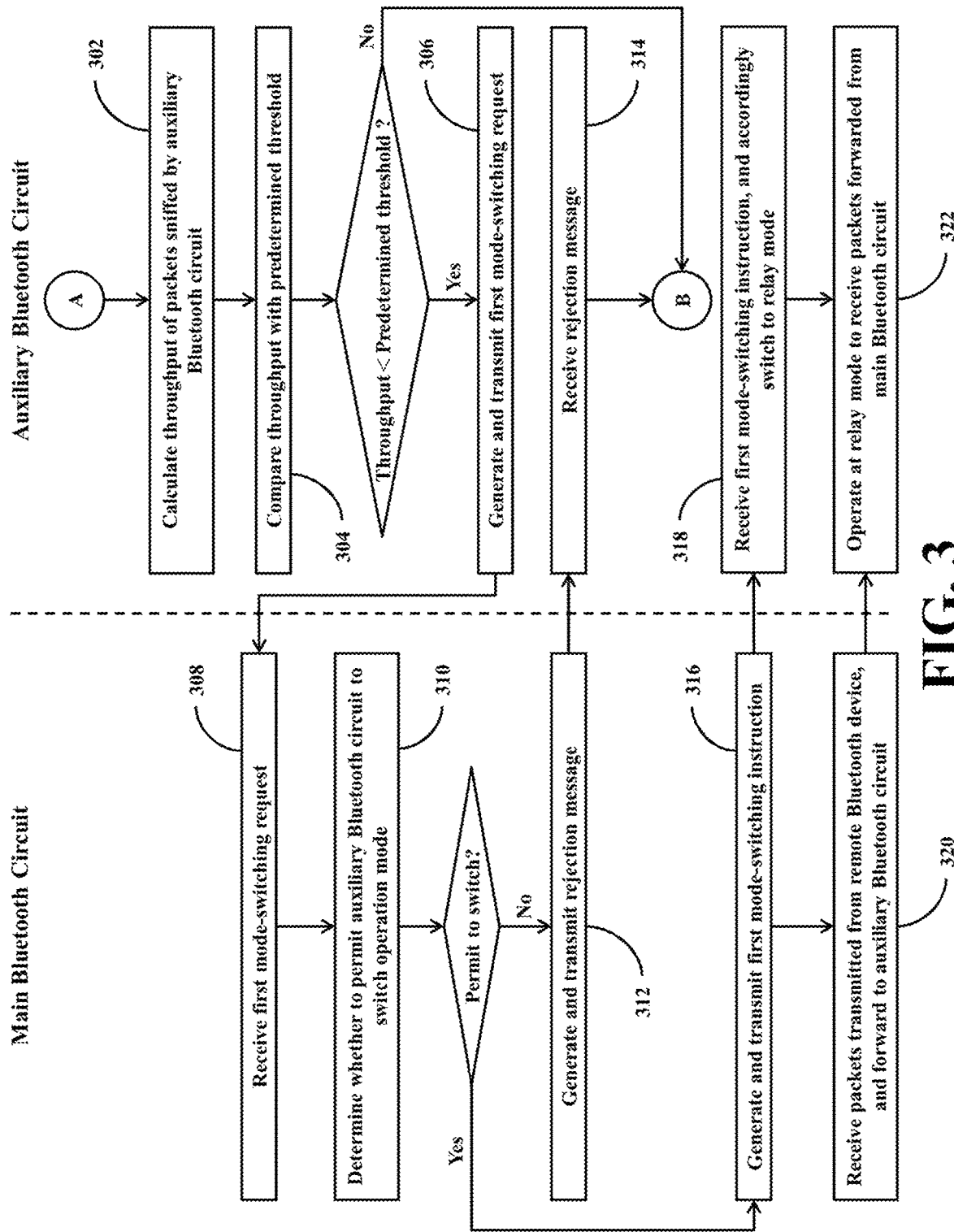

The operations of the multi-member Bluetooth device 100 will be further described in the following by reference to FIG. 2 through FIG. 3. FIGS. 2~3 collectively show a simplified flowchart of an operation method of the multi-member Bluetooth device 100 according to a first embodiment of the present disclosure.

In the flowcharts of FIGS. 2~3, operations within a column under the name of a specific device are operations to be performed by the specific device. For example, operations within a column under the label "main Bluetooth circuit" are operations to be performed by the member circuit acting as the main Bluetooth circuit; operations within a column under the label "auxiliary Bluetooth circuit" are operations to be performed by the member circuits acting as the auxiliary Bluetooth circuit; and so forth. The same analogous arrangement also applies to the subsequent flowcharts.

As shown in FIG. 2, the multi-member Bluetooth device 100 may perform the operation 202 first to acquire Bluetooth connection parameters for use in receiving the packets issued from the remote Bluetooth device 102. In practice, the multi-member Bluetooth device 100 may first utilize any one of the member circuits to connect with the remote Bluetooth device 102 to acquire related Bluetooth connection parameters, and then utilize the member circuit to transmit the acquired Bluetooth connection parameters to other member circuits.

In one embodiment, for example, the first control circuit 117 of the first Bluetooth circuit 110 may control the first Bluetooth communication circuit 111 to establish a Bluetooth connection with the remote Bluetooth device 102, and transmit the Bluetooth connection parameters adopted between the first Bluetooth circuit 110 and the remote Bluetooth device 102 to the second Bluetooth circuit 120 and other member circuits through the first Bluetooth communication circuit 111 in the operation 202, so that thereafter other member circuits can adopt the Bluetooth connection parameters to receive the packets issued from the remote Bluetooth device 102.

For another example, in another embodiment, the second control circuit 127 of the second Bluetooth circuit 120 may control the second Bluetooth communication circuit 121 to establish the Bluetooth connection with the remote Bluetooth device 102, and transmit the Bluetooth connection parameters adopted between the second Bluetooth circuit 120 and the remote Bluetooth device 102 to other member circuits through the second Bluetooth communication circuit 121 in the operation 202, so that thereafter other member circuits can adopt the Bluetooth connection parameters to receive the packets issued from the remote Bluetooth device 102. On the other hand, the second control circuit 127 may further transmit a device identification data of the second Bluetooth circuit 120 and the Bluetooth connection parameters adopted between the second Bluetooth circuit 120 and the remote Bluetooth device 102 to the first Bluetooth circuit 110 through the second Bluetooth communication circuit 121 in the operation 202, so that the first Bluetooth circuit 110 can conduct the bidirectional packet transmission with the remote Bluetooth device 102 in subsequent operations. Afterwards, the second Bluetooth circuit 120 would conduct a unidirectional packet receiving operation to receive the packets issued from the remote Bluetooth device 102, and no longer transmit the packets to the remote Bluetooth device 102, so as to avoid the remote Bluetooth device 102 from packet conflict.

For the convenience of description, it is assumed hereinafter that the member circuit being currently selected among the member circuits of the multi-member Bluetooth device 100 to perform the major duty of receiving the packets issued from the remote Bluetooth device 102 is the first Bluetooth circuit 110, and each of the other member circuits (e.g., the aforementioned second Bluetooth circuit 120 and the third Bluetooth circuit 130) acts as an auxiliary Bluetooth circuit.

In the operation 204, through the first Bluetooth communication circuit 111, the first Bluetooth circuit 110 may inform other member circuits in the multi-member Bluetooth device 100 (e.g., the aforementioned second Bluetooth circuit 120 and third Bluetooth circuit 130) of that the first Bluetooth circuit 110 will play the role of the main Bluetooth circuit in the following stage, and may instruct each of other member circuits to play the role of the auxiliary Bluetooth circuit and to operate at the sniffing mode. That is, the first Bluetooth circuit 110 will perform the major operation of receiving the packets issued from the remote Bluetooth device 102 in the following stage, and other member circuits are only allowed to sniff the packets issued from the remote Bluetooth device 102 and not allowed to transmit instructions, data, or other related packets to the remote Bluetooth device 102.

Afterwards, in a period during which the auxiliary Bluetooth circuit operates at the sniffing mode, the first Bluetooth circuit 110 performs the operation 206.

In the operation 206, the first control circuit 117 of the first Bluetooth circuit 110 utilizes the first Bluetooth communication circuit 111 to receive the packets transmitted from the remote Bluetooth device 102, but the first control circuit 117 does not forward the packets transmitted from the remote Bluetooth device 102 to other auxiliary Bluetooth circuits through the first Bluetooth communication circuit 111.

In operations, the first control circuit 117 may adopt the Bluetooth connection parameters acquired in the operation 202 to conduct packet transmission with the remote Bluetooth device 102 through the first Bluetooth communication circuit 111, so as to receive various packets transmitted from the remote Bluetooth device 102 or to transmit various packets to the remote Bluetooth device 102. As can be appreciated from the foregoing descriptions of the operation 202, the Bluetooth connection parameters adopted by the first Bluetooth circuit 110 in conducting packet transmission with the remote Bluetooth device 102 may be acquired by the first Bluetooth circuit 110 itself, or may be received from other member circuits (e.g., the second Bluetooth circuit 120).

At each time the first Bluetooth communication circuit 111 receives a packet transmitted from the remote Bluetooth device 102, the first control circuit 117 of the first Bluetooth circuit 110 may transmit a corresponding acknowledge message to the remote Bluetooth device 102 through the first Bluetooth communication circuit 111. If the remote Bluetooth device 102 does not receive a corresponding acknowledge message of a specific packet, the remote Bluetooth device 102 will retransmit the specific packet to the first Bluetooth communication circuit 111. In practice, the first Bluetooth circuit 110 and the remote Bluetooth device 102 may adopt various appropriate packet handshake mechanisms to reduce or avoid packet loss.

On the other hand, in a period during which the main Bluetooth circuit receive the packets issued from the remote Bluetooth device 102, other member circuits acting as the auxiliary Bluetooth circuit perform the operation 208 to continuously operate at the sniffing mode to sniff the packets issued from the remote Bluetooth device 102. For example, in the operation 208, the second control circuit 127 of the second Bluetooth circuit 120 may utilize the second Bluetooth communication circuit 121 to sniff the packets issued from the remote Bluetooth device 102 according to the Bluetooth connection parameters acquired in the operation 202. In one embodiment, the second Bluetooth communication circuit 121 may sniff all of the Bluetooth packets issued from the remote Bluetooth device 102. In another embodiment, the second Bluetooth communication circuit 121 only sniffs the Bluetooth packets transmitted from the remote Bluetooth device 102 to the first Bluetooth circuit 110, but does not sniff the Bluetooth packets transmitted from the remote Bluetooth device 102 to devices other than the multi-member Bluetooth device 100. As can be appreciated from the foregoing descriptions of the operation 202, the Bluetooth connection parameters adopted by the second Bluetooth communication circuit 121 in sniffing the packets issued from the remote Bluetooth device 102 may be acquired by the second Bluetooth circuit 120 itself, or may be received from other member circuits (e.g., the first Bluetooth circuit 110).

At each time a packet issued from the remote Bluetooth device 102 is sniffed by the auxiliary Bluetooth circuit, the auxiliary Bluetooth circuit may perform the operation 210. In the operation 210, the auxiliary Bluetooth circuit transmits a notification message corresponding to the sniffed packet to the main Bluetooth circuit, but does not transmit any acknowledge message to the remote Bluetooth device 102. For example, at each time a packet issued from the remote Bluetooth device 102 is sniffed by the second Bluetooth circuit 120, the second control circuit 127 may perform the operation 210 to transmit a corresponding notification message to the first Bluetooth communication circuit 111 of the first Bluetooth circuit 110 through the second Bluetooth communication circuit 121, but the second control circuit 127 does not transmit any acknowledge message to the remote Bluetooth device 102 through the second Bluetooth communication circuit 121.

In practice, the auxiliary Bluetooth circuit may perform the aforementioned operation 210 only when the main Bluetooth circuit inquires whether or not a specific packet issued from the remote Bluetooth device 102 is sniffed by the auxiliary Bluetooth circuit.

In other words, in the period during which the auxiliary Bluetooth circuit operates at the sniffing mode, each of the main Bluetooth circuit and other auxiliary Bluetooth circuits of this embodiment receive the packets issued from the remote Bluetooth device 102, but only the main Bluetooth circuit transmits an acknowledge message to the remote Bluetooth device 102 when receiving a packet, and other auxiliary Bluetooth circuits do not transmit any acknowledge message to the remote Bluetooth device 102, so as to prevent the remote Bluetooth device 102 from misjudgment. Since the remote Bluetooth device 102 is not aware of that the second Bluetooth circuit 120 is sniffing the packets issued from the remote Bluetooth device 102, nor does the second Bluetooth circuit 120 transmit any corresponding acknowledge message to the remote Bluetooth device 102, it is apparent that no packet handshake procedure is conducted between the second Bluetooth circuit 120 and the remote Bluetooth device 102 for the packets issued from the remote Bluetooth device 102.

In this embodiment, the purpose of that the second Bluetooth circuit 120 transmits the aforementioned notification message to the first Bluetooth circuit 110 is not for conducting a packet handshake procedure with the first Bluetooth circuit 110, but for enabling the first Bluetooth circuit 110 to clarify whether any packet issued from the remote Bluetooth device 102 is missed by the second Bluetooth circuit 120.

In addition, the purpose of that the second Bluetooth circuit 120 transmits the aforementioned notification message to the first Bluetooth circuit 110 is neither for the first Bluetooth circuit 110 to decide accordingly whether to transmit the aforementioned acknowledge message to the remote Bluetooth device 102. Before the first control circuit 117 of this embodiment transmits the aforementioned acknowledge message to the remote Bluetooth device 102, the first control circuit 117 does not check whether the first Bluetooth communication circuit 111 has received the aforementioned notification message transmitted from the second Bluetooth circuit 120. Accordingly, the timing of that the first Bluetooth communication circuit 111 transmits the acknowledge message to the remote Bluetooth device 102 is irrelevant to whether the first Bluetooth communication circuit 111 has received the aforementioned notification message transmitted from the second Bluetooth circuit 120.

In practice, the aforementioned notification message transmitted from the second Bluetooth circuit 120 to the first Bluetooth circuit 110 may be realized with various appropriate data formats. For example, when a specific Bluetooth packet transmitted from the remote Bluetooth device 102 is received by the second Bluetooth circuit 120, the second control circuit 127 may extract a corresponding packet sequence number from the specific Bluetooth packet, and combine or encode the packet sequence number with a device identification code or a device identification data for identifying the second Bluetooth circuit 120 to form a notification message corresponding to the specific Bluetooth packet. For another example, the second control circuit 127 may extract appropriate packet identification data from the specific Bluetooth packet, and combine or encode the packet identification data with the device identification code or the device identification data for identifying the second Bluetooth circuit 120 to form the notification message corresponding to the specific Bluetooth packet.

As can be appreciated from the foregoing descriptions, in the period during which the remote Bluetooth device 102 successively issues multiple Bluetooth packets, each of the auxiliary Bluetooth circuits repeats the aforementioned operation 208 and operation 210 to thereby transmit multiple notification messages to the first Bluetooth circuit 110 in normal situation. For example, the second Bluetooth circuit 120 repeats the operation 208 and the operation 210 to transmit multiple notification messages respectively corresponding to the multiple Bluetooth packets issued from the remote Bluetooth device 102 to the first Bluetooth circuit 110.

In practical operations, respective auxiliary Bluetooth circuit might miss some packets issued from the remote Bluetooth device 102, and different auxiliary Bluetooth circuits might miss different packets or different quantities of packets. Accordingly, the main Bluetooth circuit may intermittently or periodically perform the operation 212 to determine whether each auxiliary Bluetooth circuit has missed some packets issued from the remote Bluetooth device 102 according to a plurality of notification messages transmitted from respective auxiliary Bluetooth circuit.

In the operation 212, for example, the first control circuit 117 of the first Bluetooth circuit 110 may examine whether some packets issued from the remote Bluetooth device 102 are missed by the second Bluetooth circuit 120 according to the plurality of notification messages transmitted from the second Bluetooth circuit 120. The first packet parsing circuit 113 may parse multiple packet sequence numbers or multiple packet identification data from the plurality of notification messages transmitted from the second Bluetooth circuit 120. The first control circuit 117 may check whether these packet sequence numbers or packet identification data are consecutive, so as to examine whether some packets issued from the remote Bluetooth device 102 are missed by the second Bluetooth circuit 120. In the situation where the aforementioned packet sequence numbers or packet identification data are not consecutive, the first control circuit 117 then can determine that the packets corresponding to the missing packet sequence numbers or packet identification data are missed by the second Bluetooth circuit 120. According to the missing packet sequence numbers or missing packet identification data, the first control circuit 117 can further identify which packets are missed by the second Bluetooth circuit 120.

As can be appreciated from the foregoing descriptions, a packet handshake mechanism is adopted between the first Bluetooth circuit 110 and the remote Bluetooth device 102, thus the first Bluetooth circuit 110 should be able to successfully acquire all of the packets issued from the remote Bluetooth device 102 in normal situation.

If the first control circuit 117 determines that some packets issued from the remote Bluetooth device 102 are missed by a specific auxiliary Bluetooth circuit, the first control circuit 117 performs the operation 214 to transmit the packets missed by the auxiliary Bluetooth circuit to the auxiliary Bluetooth circuit through the first Bluetooth communication circuit 111.

For example, in the situation where the first control circuit 117 determines that a specific packet issued from the remote Bluetooth device 102 is missed by the second Bluetooth circuit 120, the first control circuit 117 may perform the operation 214 to transmit the packet missed by the second Bluetooth circuit 120 to the second Bluetooth circuit 120 through the first Bluetooth communication circuit 111.

In this situation, the second Bluetooth circuit 120 performs the operation 216 to receive the packet transmitted from the first Bluetooth circuit 110 through the second Bluetooth communication circuit 121. In other words, in the period during which the second Bluetooth circuit 120 operates at the sniffing mode, the second control circuit 127 may utilize the second Bluetooth communication circuit 121 to receive the packets transmitted from the first Bluetooth circuit 110 so as to acquire the packets issued from the remote Bluetooth device 102 but missed by the second Bluetooth communication circuit 121.

By repeating the aforementioned operations, the second Bluetooth circuit 120 may acquire all of the missed packets with the assistance of the first Bluetooth circuit 110. Similarly, the first Bluetooth circuit 110 may assist other auxiliary Bluetooth circuits to acquire the missed packets by adopting the aforementioned approach.

In the period during which the auxiliary Bluetooth circuit operates at the sniffing mode, if an auxiliary Bluetooth circuit needs to transmit instructions, data or related packets to the remote Bluetooth device 102, the instructions, data or related packets need to be forwarded to the remote Bluetooth device 102 through the main Bluetooth circuit. For example, if the second Bluetooth circuit 120 needs to transmit the instructions, data or related packets to the remote Bluetooth device 102, the second Bluetooth circuit 120 needs to transmit the aforementioned instructions, data or related packets through the second Bluetooth communication circuit 121 to the first Bluetooth circuit 110 which plays the role of the main Bluetooth circuit, and then the first Bluetooth circuit 110 will forward the aforementioned instructions, data or related packets to the remote Bluetooth device 102, so as to avoid the remote Bluetooth device 102 from packet conflict.

In other words, in the period during which the auxiliary Bluetooth circuit operates at the sniffing mode, all of the member circuits of the multi-member Bluetooth device 100 would receive the packets issued from the remote Bluetooth device 102, but only the main Bluetooth circuit is allowed to transmit instructions, data or other related packets to the remote Bluetooth device 102.

As can be appreciated from the foregoing descriptions, the first Bluetooth circuit 110 and the remote Bluetooth device 102 adopt appropriate packet handshake mechanism to avoid packet loss. In addition, the timing of that the first Bluetooth communication circuit 111 transmits the acknowledge message to the remote Bluetooth device 102 is irrelevant to whether the first Bluetooth communication circuit 111 has received the aforementioned notification message from the second Bluetooth circuit 120.

Accordingly, the operation of that other auxiliary Bluetooth circuits transmit corresponding notification messages to the first Bluetooth circuit 110 when they receive the packets issued from the remote Bluetooth device 102 would not cause interference or delay to the packet handshake procedure conducted between the first Bluetooth circuit 110 and the remote Bluetooth device 102, neither would it cause additional operating burden on the first Bluetooth circuit 110 in conducting the aforementioned packet handshake procedure.

On the other hand, since other auxiliary Bluetooth circuits (e.g., the aforementioned second Bluetooth circuit 120 and the third Bluetooth circuit 130) in the multi-member Bluetooth device 100 sniff the packets issued from the remote Bluetooth device 102, each of the auxiliary Bluetooth circuits may acquire most of the packets issued from the remote Bluetooth device 102 in normal situation. Therefore, the first Bluetooth circuit 110 currently acting as the main Bluetooth circuit only needs to transmit the packets missed by respective auxiliary Bluetooth circuits to the corresponding auxiliary Bluetooth circuit, and does not need to transmit all of the packets issued from the remote Bluetooth device 102 to each of the auxiliary Bluetooth circuits.

Therefore, by adopting the approach of FIG. 2 to interact with the remote Bluetooth device 102, the multi-member Bluetooth device 100 could significantly reduce the packet forward loading of the main Bluetooth circuit (e.g., the first Bluetooth circuit 110 in this embodiment), thereby reducing the power consumption of the main Bluetooth circuit. In this way, the serving time and the standby time of the main Bluetooth circuit can be effectively extended.

Additionally, adopting the approach of FIG. 2 can also significantly reduce the bandwidth requirement for data transmission between the main Bluetooth circuit and other member circuits, and thus it could simplify the hardware design of the main Bluetooth circuit and other member circuits, and/or reduce the circuit complexity and circuit cost of the main Bluetooth circuit and other member circuits.

In operations, various existing data synchronization mechanisms may be adopted between the main Bluetooth circuit and other auxiliary Bluetooth circuits to ensure that different member circuits are able to synchronically playback the audio data or video data transmitted from the remote Bluetooth device 102, thereby avoiding the situation where different member circuits have inconsistent playback timings from occurring.

As can be appreciated from the foregoing descriptions, in the period during which the auxiliary Bluetooth circuit operates at the sniffing mode, although the main Bluetooth circuit and the auxiliary Bluetooth circuit do not exchange their roles with each other, the wireless signal environment of Bluetooth communication may change with time due to various factors, or may change under the influence of a user's posture or the user's usage habit. If the cooperation between the main Bluetooth circuit and the auxiliary Bluetooth circuit does not react to and dynamically adjust based on the current Bluetooth communication environment condition, the overall operating performance of the multi-member Bluetooth device 100 would easily degrade, or it would reduce the standby time of the main Bluetooth circuit or the auxiliary Bluetooth circuit. In some situations, it could reduce the service life of the auxiliary Bluetooth circuit or the main Bluetooth circuit, or reduce the comfort level in using the auxiliary Bluetooth circuit or the main Bluetooth circuit.

In this embodiment, as shown in FIG. 3, in the period during which the auxiliary Bluetooth circuit operates at the sniffing mode, the auxiliary Bluetooth circuit may further perform the operation 302 intermittently to calculate the throughput of the packets sniffed by the auxiliary Bluetooth circuit itself. For example, the second control circuit 127 of the second Bluetooth circuit 120 may calculate the throughput of packets issued from the remote Bluetooth device 102 and sniffed by the second Bluetooth communication circuit 121 so as to generate a corresponding throughput in the operation 302.

Afterwards, the second control circuit 127 may perform the operation 304 to compare the throughput of packets sniffed by the second Bluetooth communication circuit 121 with a predetermined threshold.

If the throughput of packets sniffed by the second Bluetooth communication circuit 121 is higher than the predetermined threshold, it means that the quantity of packets issued from the remote Bluetooth device 102 is within a normal range, and that the current wireless signal environment where the second Bluetooth circuit 120 conducts Bluetooth communication is acceptable. In this situation, the second Bluetooth circuit 120 may continue to operate at the sniffing mode, and repeat the aforementioned operation 208 through the operation 304.

On the contrary, if the throughput of packets sniffed by the second Bluetooth communication circuit 121 is lower than the predetermined threshold, it means that the current wireless signal environment where the second Bluetooth circuit 120 conducts Bluetooth communication is not acceptable, or that the remote Bluetooth device 102 issues a small quantity of packets, or even that the remote Bluetooth device 102 is staying in a hibernate mode. In this situation, the second Bluetooth circuit 120 may perform the operation 306.

In the operation 306, the second control circuit 127 generates a first mode-switching request, and transmits the first mode-switching request to the main Bluetooth circuit through the second Bluetooth communication circuit 121. The aforementioned first mode-switching request is utilized to request the main Bluetooth circuit to permit the second Bluetooth circuit 120 to switch from the sniffing mode to the relay mode. In practice, the first mode-switching request may be realized with various appropriate data formats.

In the operation 308, the first Bluetooth circuit 110 utilizes the first Bluetooth communication circuit 111 to receive the first mode-switching request transmitted from the second Bluetooth circuit 120.

In the operation 310, the first control circuit 117 of the first Bluetooth circuit 110 determines whether to permit the second Bluetooth circuit 120 to switch the operation mode. In this embodiment, after the first control circuit 117 receives the aforementioned first mode-switching request, the first control circuit 117 may determine whether to permit the second Bluetooth circuit 120 to switch the operation mode according to predetermined rules, and perform corresponding subsequent operations according to the determining results. If the first control circuit 117 determines not to permit the second Bluetooth circuit 120 to switch the operation mode, the first control circuit 117 would perform the operation 312. On the contrary, if the first control circuit 117 determines to permit the second Bluetooth circuit 120 to switch the operation mode, the first control circuit 117 would perform the operation 316.

The second Bluetooth circuit 120 is allowed to switch from the sniffing mode to the relay mode after the first Bluetooth circuit 110 permits the auxiliary Bluetooth circuit to switch the operation mode, and in the following stage, the first Bluetooth circuit 110 then needs to forward the packets issued from the remote Bluetooth device 102 to the second Bluetooth circuit 120. As a result, it increases the computing loading, power consumption, and heat generation of the first Bluetooth circuit 110 as well as the bandwidth requirement for data transmission between the first Bluetooth circuit 110 and the second Bluetooth circuit 120.

Therefore, after receiving the aforementioned first mode-switching request, the first control circuit 117 may evaluate factors such as the current computing loading, remaining power, temperature, and/or available data bandwidth of the first Bluetooth circuit 110, and permit the second Bluetooth circuit 120 to switch the operation mode only if the evaluation results match predetermined conditions. For example, the first control circuit 117 may permit the second Bluetooth circuit 120 to switch the operation mode only if the current computing loading of the main Bluetooth circuit is below a predetermined level, the remaining power of the main Bluetooth circuit exceeds a predetermined threshold, the temperature of the main Bluetooth circuit is lower than a predetermined temperature, and/or the available data bandwidth of the main Bluetooth circuit exceeds a predetermined value.

In the operation 312, the first control circuit 117 generates a rejection message which represents that the first Bluetooth circuit 110 does not permit the second Bluetooth circuit 120 to switch the operation mode, and transmits the rejection message to the second Bluetooth circuit 120 through the first Bluetooth communication circuit 111.

In the operation 314, the second Bluetooth circuit 120 utilizes the second Bluetooth communication circuit 121 to receive the rejection message transmitted from the first Bluetooth circuit 110. In this situation, the second control circuit 127 controls the second Bluetooth circuit 120 to continue to operate at the sniffing mode according to the instruction of the rejection message and repeat the aforementioned operation 208 through the operation 304.

In the operation 316, the first control circuit 117 of the first Bluetooth circuit 110 generates a first mode-switching instruction for instructing the second Bluetooth circuit 120 to switch from the sniffing mode to the relay mode, and transmits the first mode-switching instruction to the second Bluetooth circuit 120 through the first Bluetooth communication circuit 111.

In the operation 318, the second Bluetooth communication circuit 121 receives the first mode-switching instruction transmitted from the first Bluetooth circuit 110, and the second control circuit 127 switches the operation mode of the second Bluetooth circuit 120 from the sniffing mode to the relay mode according to the first mode-switching instruction.

Afterwards, the first Bluetooth circuit 110 performs the operation 310, and the second Bluetooth circuit 120 performs the operation 322.

In the operation 320, the first control circuit 117 of the first Bluetooth circuit 110 utilizes the first Bluetooth communication circuit 111 to receive the packets transmitted from the remote Bluetooth device 102, and forwards the received packets to the second Bluetooth circuit 120 through the first Bluetooth communication circuit 111.

In the operation 322, the second control circuit 127 controls the second Bluetooth circuit 120 to operate at the relay mode, and utilizes the second Bluetooth communication circuit 121 to receive the packets forwarded from the first Bluetooth circuit 110. But in a period during which the second Bluetooth circuit 120 operates at the relay mode, the second control circuit 127 does not utilize the second Bluetooth communication circuit 121 to sniff the packets issued from the remote Bluetooth device 102. In other words, in the period during which the second Bluetooth circuit 120 operates at the relay mode, the second Bluetooth circuit 120 indirectly acquires the packets issued from the remote Bluetooth device 102 through the first Bluetooth circuit 110.

Please note that the aforementioned operation approach that the first control circuit 117 first performs the determination procedure of the operation 310 and then performs the operation 316 after determining that the first Bluetooth circuit 110 matches specific predetermined conditions is merely an example embodiment, rather than a restriction to the practical implementations. In practice, the first control circuit 117 may skip the aforementioned determination procedure of the operation 310 and directly proceed to perform the operation 316 after receiving the aforementioned first mode-switching request.

As can be appreciated from the foregoing descriptions, in the period during which the second Bluetooth circuit 120 which plays the role of the auxiliary Bluetooth circuit operates at the sniffing mode, the second Bluetooth circuit 120 intermittently compares the throughput of packets sniffed by the second Bluetooth circuit 120 itself with a predetermined threshold to evaluate whether the Bluetooth wireless signal environment of the second Bluetooth circuit 120 has deteriorated, or evaluates whether the quantity of packets issued from the remote Bluetooth device 102 has significantly decreased. If the throughput of packets sniffed by the second Bluetooth circuit 120 is higher than the aforementioned predetermined threshold (that is, the quantity of packets issued from the remote Bluetooth device 102 is within a normal range, and that Bluetooth wireless signal environment of the second Bluetooth circuit 120 is acceptable), the first Bluetooth circuit 110 which plays the role of the main Bluetooth circuit would not instruct the second Bluetooth circuit 120 to switch to the relay mode. In this situation, the first Bluetooth circuit 110 only needs to transmit the packets missed by the second Bluetooth circuit 120 to the second Bluetooth circuit 120, and does not need to forward all of the packets issued from the remote Bluetooth device 102 to the second Bluetooth circuit 120, thus the operating burden, power consumption, and heat generation of the first Bluetooth circuit 110 can be reduced, the serving time and the standby time of the first Bluetooth circuit 110 can be extended, and the bandwidth requirement for data transmission between the first Bluetooth circuit 110 and the second Bluetooth circuit 120 can be reduced.

The first Bluetooth circuit 110 instructs the second Bluetooth circuit 120 to switch the operation mode from the sniffing mode to the relay mode only if the throughput of packets sniffed by the second Bluetooth circuit 120 is lower than the aforementioned predetermined threshold, that is, the Bluetooth wireless signal environment of the second Bluetooth circuit 120 becomes to be unacceptable, or that the remote Bluetooth device 102 issues a small quantity of packets, or that the remote Bluetooth device 102 is staying in a hibernate mode. In this situation, the first Bluetooth circuit 110 forwards all of the packets issued from the remote Bluetooth device 102 to the second Bluetooth circuit 120, and the second Bluetooth circuit 120 stops sniffing the packets issued from the remote Bluetooth device 102, thus reducing the operating burden, power consumption, and heat generation of the second Bluetooth circuit 120. As a result, the serving time and the standby time of the second Bluetooth circuit 120 can be extended, the service life of the second Bluetooth circuit 120 can be extended, and/or the comfort level in using the second Bluetooth circuit 120 can be improved. Adopting the aforementioned approach can even allow the second Bluetooth circuit 120 to enter a power saving mode, a hibernate mode, or a sleep mode, thereby reducing the power consumption of the second Bluetooth circuit 120.

Similarly, the multi-member Bluetooth device 100 may dynamically switch the operation mode of the third Bluetooth circuit 130 according to the throughput of packets sniffed by the third Bluetooth circuit 130 as elaborated above.

Accordingly, by adopting the operation approach of aforementioned FIG. 2 and FIG. 3, the main Bluetooth circuit of the multi-member Bluetooth device 100 may dynamically switch the operation mode of the auxiliary Bluetooth circuit from the sniffing mode to the relay mode, and adaptively adjust the cooperation between the main Bluetooth circuit and the auxiliary Bluetooth circuit. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Figure 4:
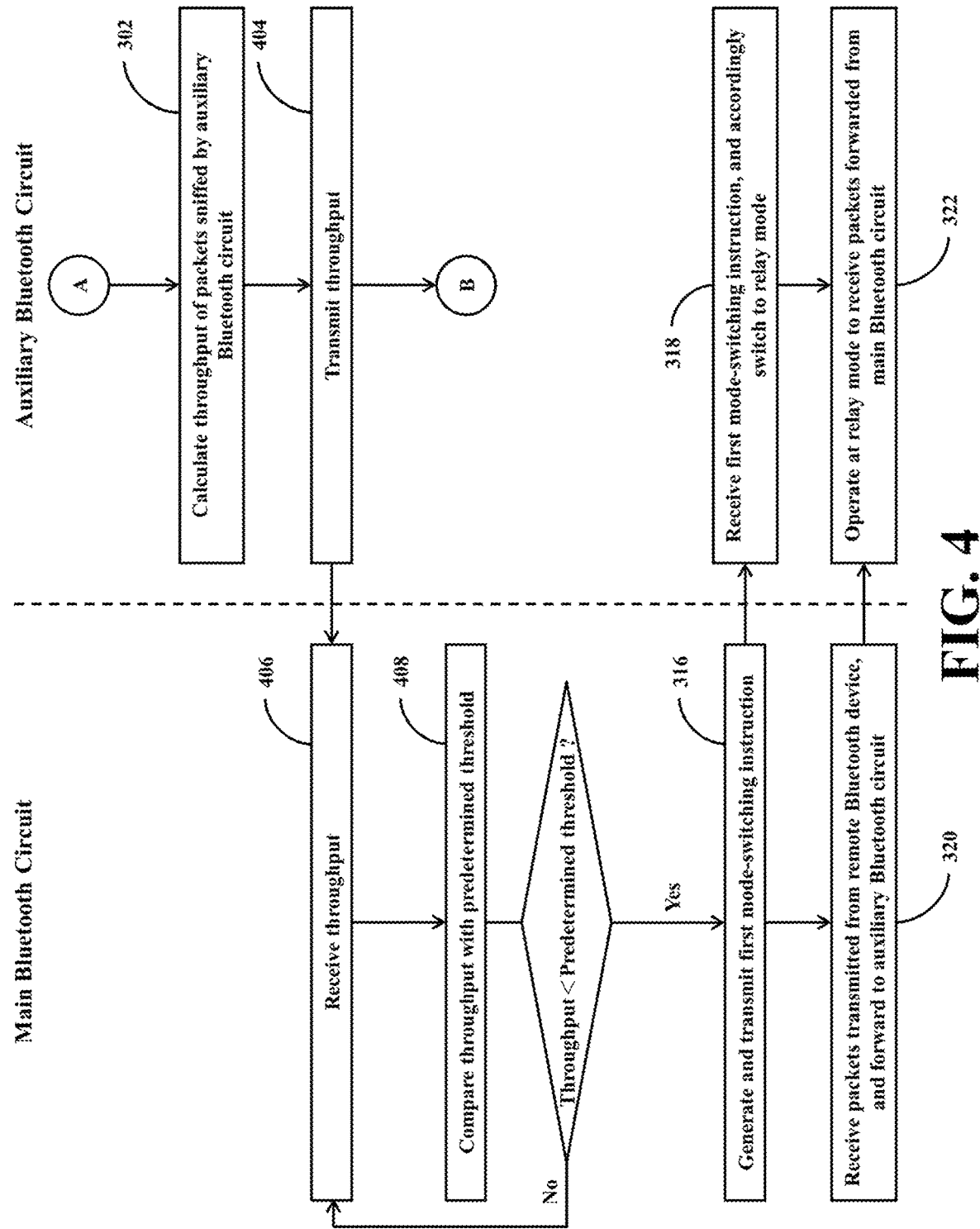
FIG. 4 shows a simplified partial flowchart of the operation method of the multi-member Bluetooth device according to a second embodiment of the present disclosure.

Please refer to FIG. 4, which shows a simplified partial flowchart of the operation method of the multi-member Bluetooth device 100 according to a second embodiment of the present disclosure. The operations described in FIG. 4 may be combined with the aforementioned operations described in FIG. 2.

In the embodiment of FIG. 4, in the period during which the auxiliary Bluetooth circuit operates at the sniffing mode, the auxiliary Bluetooth circuit similarly performs the operation 302 intermittently to calculate the throughput of the packets sniffed by the auxiliary Bluetooth circuit itself. However, after the auxiliary Bluetooth circuit of this embodiment performs the operation 302, the auxiliary Bluetooth circuit does not perform the aforementioned operation 304 but performs the operation 404 in FIG. 4 to transmit the throughput of the packets sniffed by the auxiliary Bluetooth circuit itself to the main Bluetooth circuit.

For example, after the second Bluetooth circuit 120 calculates the aforementioned throughput in the operation 302, the second Bluetooth circuit 120 performs the operation 404. In this situation, the second control circuit 127 transmits the throughput to the first Bluetooth circuit 110 through the second Bluetooth communication circuit 121.

In the operation 406, the first Bluetooth circuit 110 utilizes the first Bluetooth communication circuit 111 to receive the throughput transmitted from the second Bluetooth circuit 120.

Then, the first control circuit 117 performs the operation 408 to compare the throughput of packets sniffed by the second Bluetooth circuit 120 with a predetermined threshold.

If the throughput of packets sniffed by the second Bluetooth circuit 120 is higher than the predetermined threshold, it means that the quantity of packets issued from the remote Bluetooth device 102 is within a normal range, and that the current wireless signal environment where the second Bluetooth circuit 120 conducts Bluetooth communication is acceptable. In this situation, the first Bluetooth circuit 110 repeats the aforementioned operation 406 and operation 408, and does not adjust the operation mode of the second Bluetooth circuit 120.

On the contrary, if the throughput of packets sniffed by the second Bluetooth circuit 120 is lower than the predetermined threshold, it means that the current wireless signal environment where the second Bluetooth circuit 120 conducts Bluetooth communication is not acceptable, or that the remote Bluetooth device 102 issues a small quantity of packets, or even that the remote Bluetooth device 102 is staying in a hibernate mode. In this situation, the multi-member Bluetooth device 100 may perform the aforementioned operation 316 through operation 322 in FIG. 3.

Similar to the aforementioned embodiment in FIG. 3, the first Bluetooth circuit 110 instructs the second Bluetooth circuit 120 to switch the operation mode from the sniffing mode to the relay mode only if the throughput of packets sniffed by the second Bluetooth circuit 120 is lower than the aforementioned predetermined threshold, that is, the Bluetooth wireless signal environment of the second Bluetooth circuit 120 becomes to be unacceptable, or that the remote Bluetooth device 102 issues a small quantity of packets, or that the remote Bluetooth device 102 is staying in a hibernate mode. In this situation, the first Bluetooth circuit 110 forwards all of the packets issued from the remote Bluetooth device 102 to the second Bluetooth circuit 120, and the second Bluetooth circuit 120 stops sniffing the packets issued from the remote Bluetooth device 102, thus reducing the operating burden, power consumption, and heat generation of the second Bluetooth circuit 120. In this way, the serving time and the standby time of the second Bluetooth circuit 120 can be extended, the service life of the second Bluetooth circuit 120 can be extended, and/or the comfort level in using the second Bluetooth circuit 120 can be improved. Adopting the aforementioned approach can even allow the second Bluetooth circuit 120 to enter a power saving mode, a hibernate mode, or a sleep mode, thereby reducing the power consumption of the second Bluetooth circuit 120.

Similarly, the multi-member Bluetooth device 100 may dynamically switch the operation mode of the third Bluetooth circuit 130 according to the throughput of packets sniffed by the third Bluetooth circuit 130 as elaborated above.

Accordingly, by adopting the operation approach described in aforementioned FIG. 2 and FIG. 4, the main Bluetooth circuit of the multi-member Bluetooth device 100 may dynamically switch the operation mode of the auxiliary Bluetooth circuit from the sniffing mode to the relay mode, and adaptively adjust the cooperation between the main Bluetooth circuit and the auxiliary Bluetooth circuit. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Figure 5:
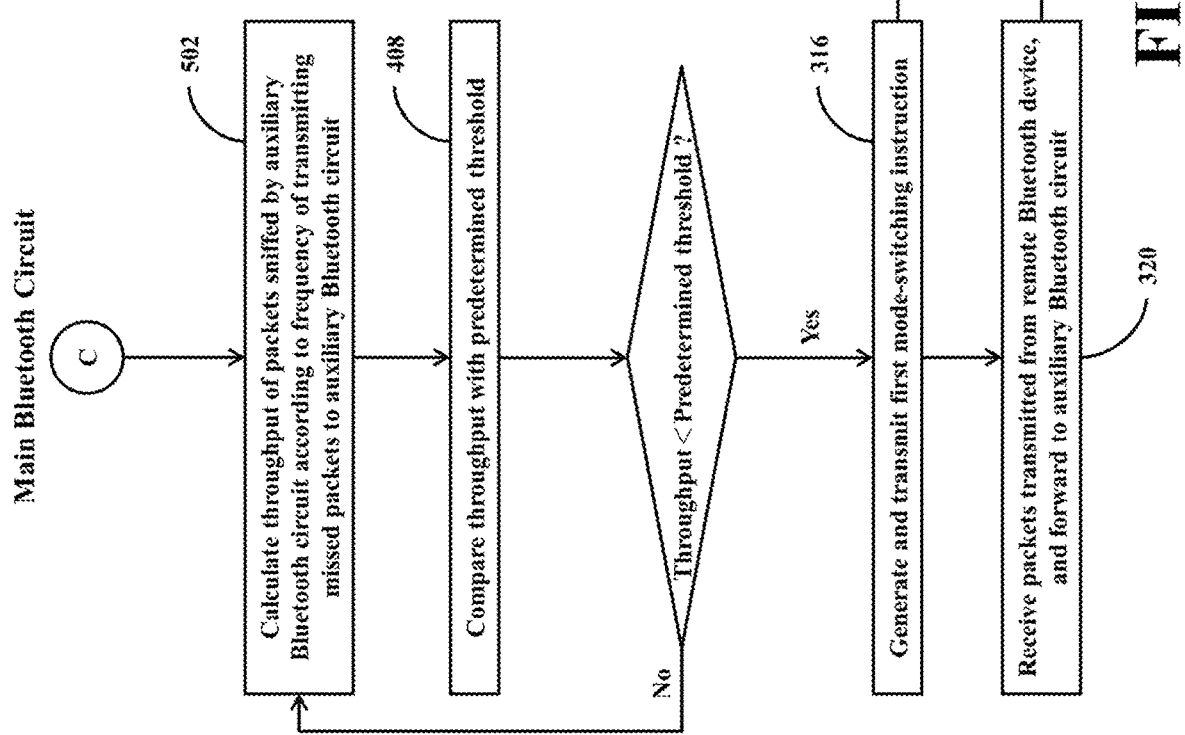
FIG. 5 shows a simplified partial flowchart of the operation method of the multi-member Bluetooth device according to a third embodiment of the present disclosure.

Please refer to FIG. 5, which shows a simplified partial flowchart of the operation method of the multi-member Bluetooth device 100 according to a third embodiment of the present disclosure. The operations described in FIG. 5 may be combined with the aforementioned operations described in FIG. 2.

In the embodiment of FIG. 5, in the period during which the auxiliary Bluetooth circuit operates at the sniffing mode, the main Bluetooth circuit performs the operation 502 intermittently to calculate the throughput of the packets sniffed by the auxiliary Bluetooth circuit.

For example, in the operation 502, the first control circuit 117 of the first Bluetooth circuit 110 may calculate the throughput of packets sniffed by the second Bluetooth circuit 120 according to a frequency of that the first control circuit 117 transmits missed packets to the second Bluetooth communication circuit 121 through the first Bluetooth communication circuit 111.

In normal situation, the first control circuit 117 transmits missed packets to the second Bluetooth communication circuit 121 through the first Bluetooth communication circuit 111 at a lower frequency means that the second Bluetooth circuit 120 sniffs the packets issued from the remote Bluetooth device 102 more smoothly, thus the throughput of packets sniffed by the second Bluetooth circuit 120 would be higher. On the contrary, the first control circuit 117 transmits missed packets to the second Bluetooth communication circuit 121 through the first Bluetooth communication circuit 111 at a higher frequency means that the second Bluetooth circuit 120 sniffs the packets issued from the remote Bluetooth device 102 less smoothly, thus the throughput of packets sniffed by the second Bluetooth circuit 120 would be lower. Therefore, the first control circuit 117 may indirectly calculate the throughput of packets sniffed by the second Bluetooth circuit 120 according to the frequency that the first Bluetooth communication circuit 111 transmits the missed packets to the second Bluetooth communication circuit 121 through the first Bluetooth communication circuit 111.

Then, the first control circuit 117 may perform the operation 408 to compare the aforementioned calculated throughput with a predetermined threshold.

If the throughput calculated by the first Bluetooth circuit 110 is higher than the predetermined threshold, it means that the quantity of packets issued from the remote Bluetooth device 102 is within a normal range, and that the current wireless signal environment where the second Bluetooth circuit 120 conducts Bluetooth communication is acceptable. In this situation, the first Bluetooth circuit 110 repeats the aforementioned operation 502 and operation 408, and does not adjust the operation mode of the second Bluetooth circuit 120.

On the contrary, if the throughput calculated by the first Bluetooth circuit 110 is lower than the predetermined threshold, it means that the current wireless signal environment where the second Bluetooth circuit 120 conducts Bluetooth communication is not acceptable, or that the remote Bluetooth device 102 issues a small quantity of packets, or even that the remote Bluetooth device 102 is staying in a hibernate mode. In this situation, the multi-member Bluetooth device 100 may perform the aforementioned operation 316 through operation 322 in FIG. 3.

The first Bluetooth circuit 110 instructs the second Bluetooth circuit 120 to switch the operation mode from the sniffing mode to the relay mode only if the throughput calculated by the first Bluetooth circuit 110 is lower than the aforementioned predetermined threshold, that is, the Bluetooth wireless signal environment of the second Bluetooth circuit 120 becomes to be unacceptable, or that the remote Bluetooth device 102 issues a small quantity of packets, or that the remote Bluetooth device 102 is staying in a hibernate mode. In this situation, the first Bluetooth circuit 110 forwards all of the packets issued from the remote Bluetooth device 102 to the second Bluetooth circuit 120, and the second Bluetooth circuit 120 stops sniffing the packets issued from the remote Bluetooth device 102, thus reducing the operating burden, power consumption, and heat generation of the second Bluetooth circuit 120. As a result, the serving time and the standby time of the second Bluetooth circuit 120 can be extended, the service life of the second Bluetooth circuit 120 can be extended, and/or the comfort level in using the second Bluetooth circuit 120 can be improved. Adopting the aforementioned approach can even allow the second Bluetooth circuit 120 to enter a power saving mode, a hibernate mode, or a sleep mode, thereby reducing the power consumption of the second Bluetooth circuit 120.

Similarly, the multi-member Bluetooth device 100 may dynamically switch the operation mode of the third Bluetooth circuit 130 according to the throughput of packets sniffed by the third Bluetooth circuit 130 as elaborated above.

Accordingly, by adopting the operation approach of aforementioned FIG. 2 and FIG. 5, the main Bluetooth circuit of the multi-member Bluetooth device 100 may dynamically switch the operation mode of the auxiliary Bluetooth circuit from the sniffing mode to the relay mode, and adaptively adjust the cooperation between the main Bluetooth circuit and the auxiliary Bluetooth circuit. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Figure 6:
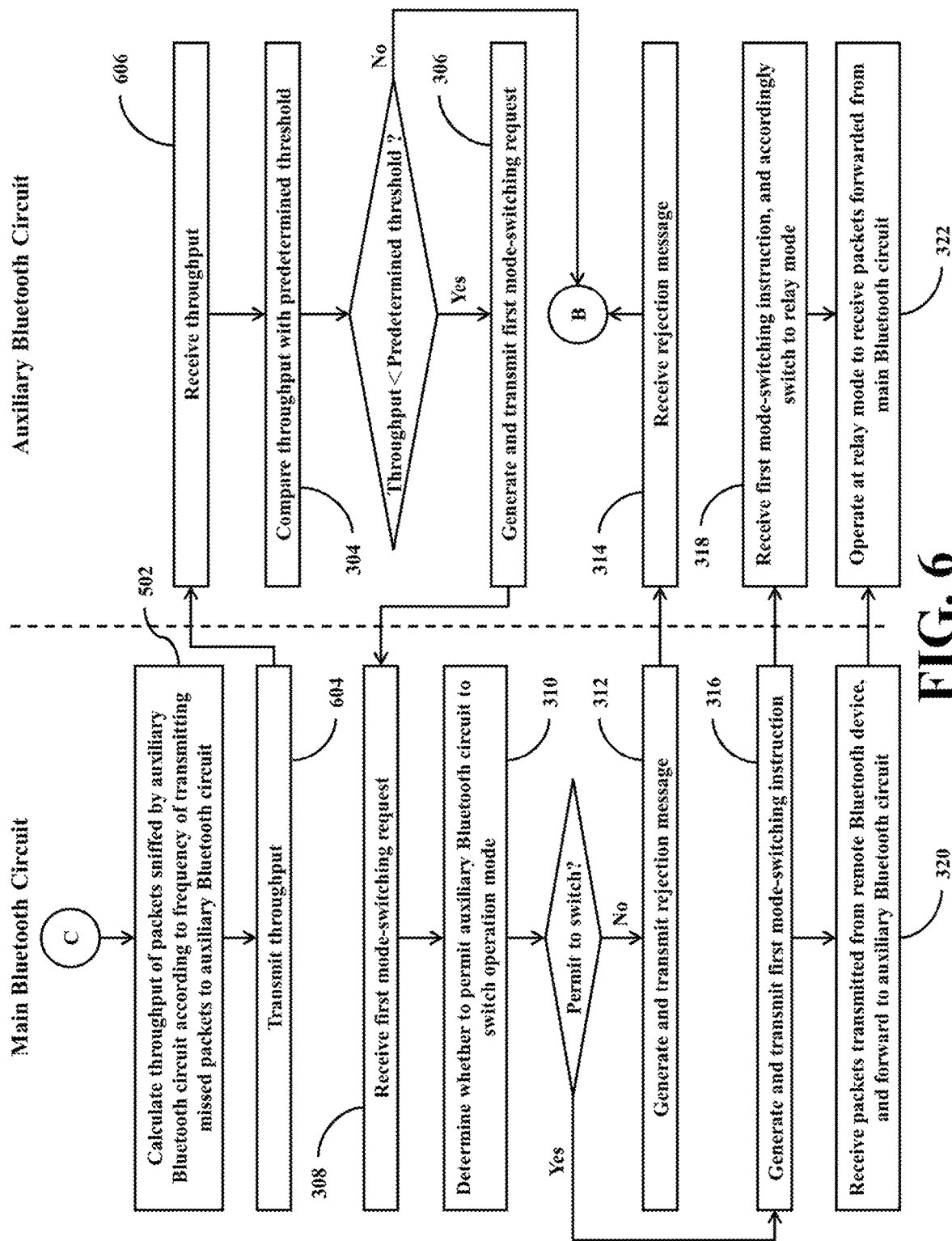
FIG. 6 shows a simplified partial flowchart of the operation method of the multi-member Bluetooth device according to a fourth embodiment of the present disclosure.

Please refer to FIG. 6, which shows a simplified partial flowchart of the operation method of the multi-member Bluetooth device 100 according to a fourth embodiment of the present disclosure. The operations described in FIG. 6 may be combined with the aforementioned operations described in FIG. 2.

In the embodiment of FIG. 6, in the period during which the auxiliary Bluetooth circuit operates at the sniffing mode, the main Bluetooth circuit performs the operation 502 intermittently to calculate the throughput of the packets sniffed by the auxiliary Bluetooth circuit. However, after the main Bluetooth circuit of this embodiment performs the operation 502, the main Bluetooth circuit does not perform the aforementioned operation 408 but performs the operation 604 in FIG. 6 to transmit the throughput calculated by the main Bluetooth circuit to the auxiliary Bluetooth circuit for further determination.

For example, after the first Bluetooth circuit 110 calculates the aforementioned throughput of packets sniffed by the second Bluetooth circuit 120 in the operation 502, the first Bluetooth circuit 110 performs the operation 604. In this situation, the first control circuit 117 transmits the calculated throughput to the second Bluetooth circuit 120 through the first Bluetooth communication circuit 111.

In the operation 606, the second Bluetooth circuit 120 utilizes the second Bluetooth communication circuit 121 to receive the throughput transmitted from the first Bluetooth circuit 110.

Then, the second control circuit 127 performs the aforementioned operation 304 to compare the throughput calculated by the first Bluetooth circuit 110 with a predetermined threshold.

If the throughput calculated by the first Bluetooth circuit 110 is higher than the predetermined threshold, it means that the quantity of packets issued from the remote Bluetooth device 102 is within a normal range, and that the current wireless signal environment where the second Bluetooth circuit 120 conducts Bluetooth communication is acceptable. In this situation, the second Bluetooth circuit 120 repeats the aforementioned operation 208 and operation 210.

On the contrary, if the throughput calculated by the first Bluetooth circuit 110 is lower than the predetermined threshold, it means that the current wireless signal environment where the second Bluetooth circuit 120 conducts Bluetooth communication is not acceptable, or that the remote Bluetooth device 102 issues a small quantity of packets, or even that the remote Bluetooth device 102 is staying in a hibernate mode. In this situation, the second Bluetooth circuit 120 may perform the aforementioned operation 306 to generate a first mode-switching request, and transmit the aforementioned first mode-switching request to the main Bluetooth circuit through the second Bluetooth communication circuit 121.

Afterwards, the multi-member Bluetooth device 100 may perform the aforementioned operation 308 through operation 322 in FIG. 3.

Similar to the aforementioned embodiment in FIG. 5, the first Bluetooth circuit 110 instructs the second Bluetooth circuit 120 to switch the operation mode from the sniffing mode to the relay mode only if the throughput calculated by the first Bluetooth circuit 110 is lower than the aforementioned predetermined threshold, that is, the Bluetooth wireless signal environment of the second Bluetooth circuit 120 becomes to be unacceptable, or that the remote Bluetooth device 102 issues a small quantity of packets, or that the remote Bluetooth device 102 is staying in a hibernate mode. In this situation, the first Bluetooth circuit 110 forwards all of the packets issued from the remote Bluetooth device 102 to the second Bluetooth circuit 120, and the second Bluetooth circuit 120 stops sniffing the packets issued from the remote Bluetooth device 102, thus reducing the operating burden, power consumption, and heat generation of the second Bluetooth circuit 120. As a result, the serving time and the standby time of the second Bluetooth circuit 120 can be extended, the service life of the second Bluetooth circuit 120 can be extended, and/or the comfort level in using the second Bluetooth circuit 120 can be improved. Adopting the aforementioned approach can even allow the second Bluetooth circuit 120 to enter a power saving mode, a hibernate mode, or a sleep mode, thereby reducing the power consumption of the second Bluetooth circuit 120.

Similarly, the multi-member Bluetooth device 100 may dynamically switch the operation mode of the third Bluetooth circuit 130 according to the throughput of packets sniffed by the third Bluetooth circuit 130 as elaborated above.

Accordingly, by adopting the operation approach of the aforementioned FIG. 2 and FIG. 6, the main Bluetooth circuit of the multi-member Bluetooth device 100 may dynamically switch the operation mode of the auxiliary Bluetooth circuit from the sniffing mode to the relay mode, and adaptively adjust the cooperation between the main Bluetooth circuit and the auxiliary Bluetooth circuit. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

In the aforementioned embodiments of FIG. 2 through FIG. 6, in the period during which the auxiliary Bluetooth circuit operates at the sniffing mode, the multi-member Bluetooth device 100 evaluates whether the Bluetooth wireless signal environment of the auxiliary Bluetooth circuit has deteriorated, or evaluates whether the quantity of packets issued from the remote Bluetooth device 102 has significantly decreased according to the throughput calculated by the auxiliary Bluetooth circuit or the main Bluetooth circuit, and decides whether to switch the operation mode of the auxiliary Bluetooth circuit from the sniffing mode to the relay mode according to the evaluation results. However, these are merely some embodiments, rather than a restriction to the practical implementations. In practice, in the period during which the auxiliary Bluetooth circuit operates at the relay mode, the multi-member Bluetooth device 100 may dynamically determine whether to switch the operation mode of the auxiliary Bluetooth circuit based on changes occurring in the current Bluetooth wireless signal environment.

Figure 7:
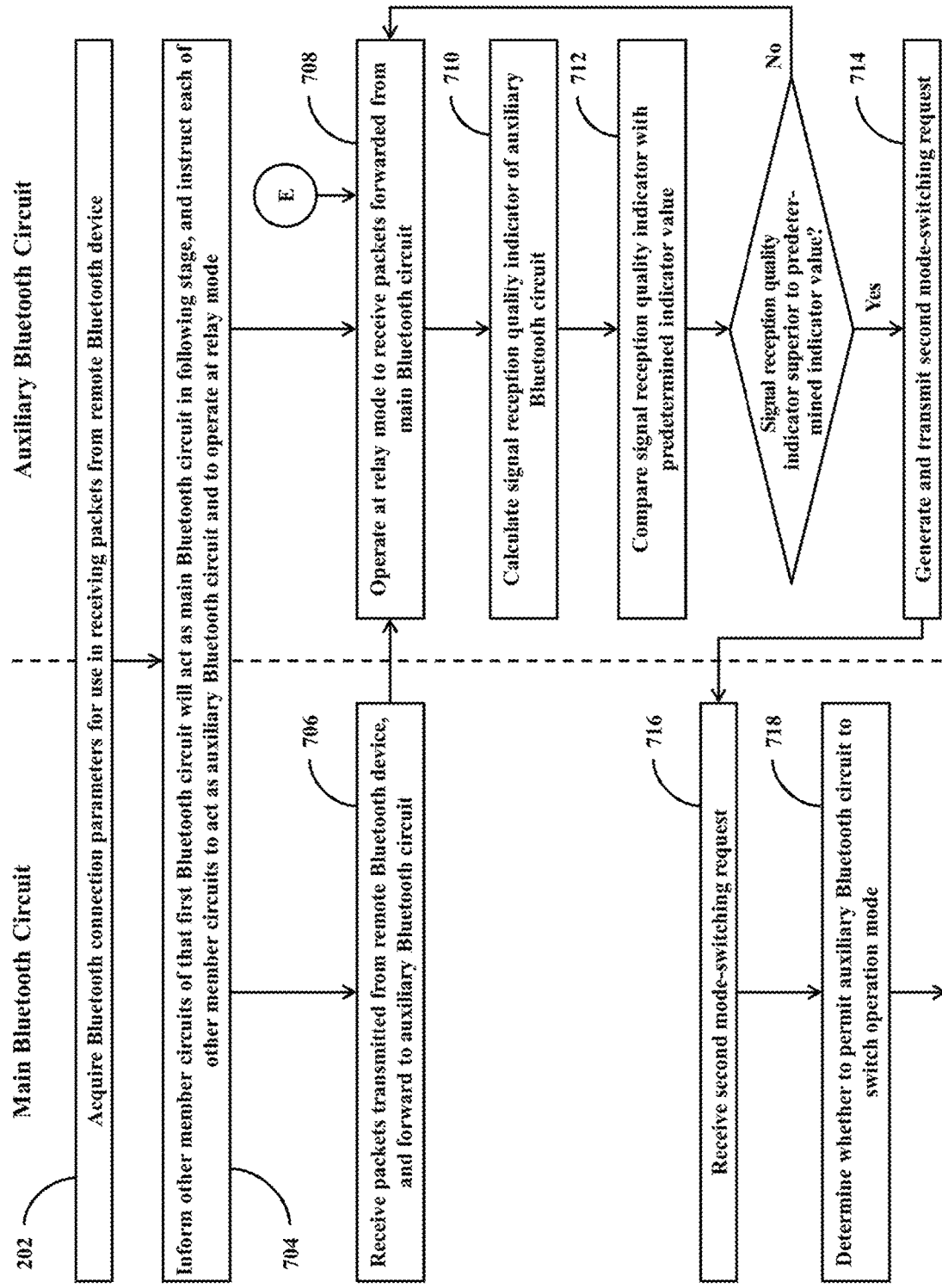
FIGS. 7~8 collectively show a simplified flowchart of the operation method of the multi-member Bluetooth device according to a fifth embodiment of the present disclosure.
Figure 8:
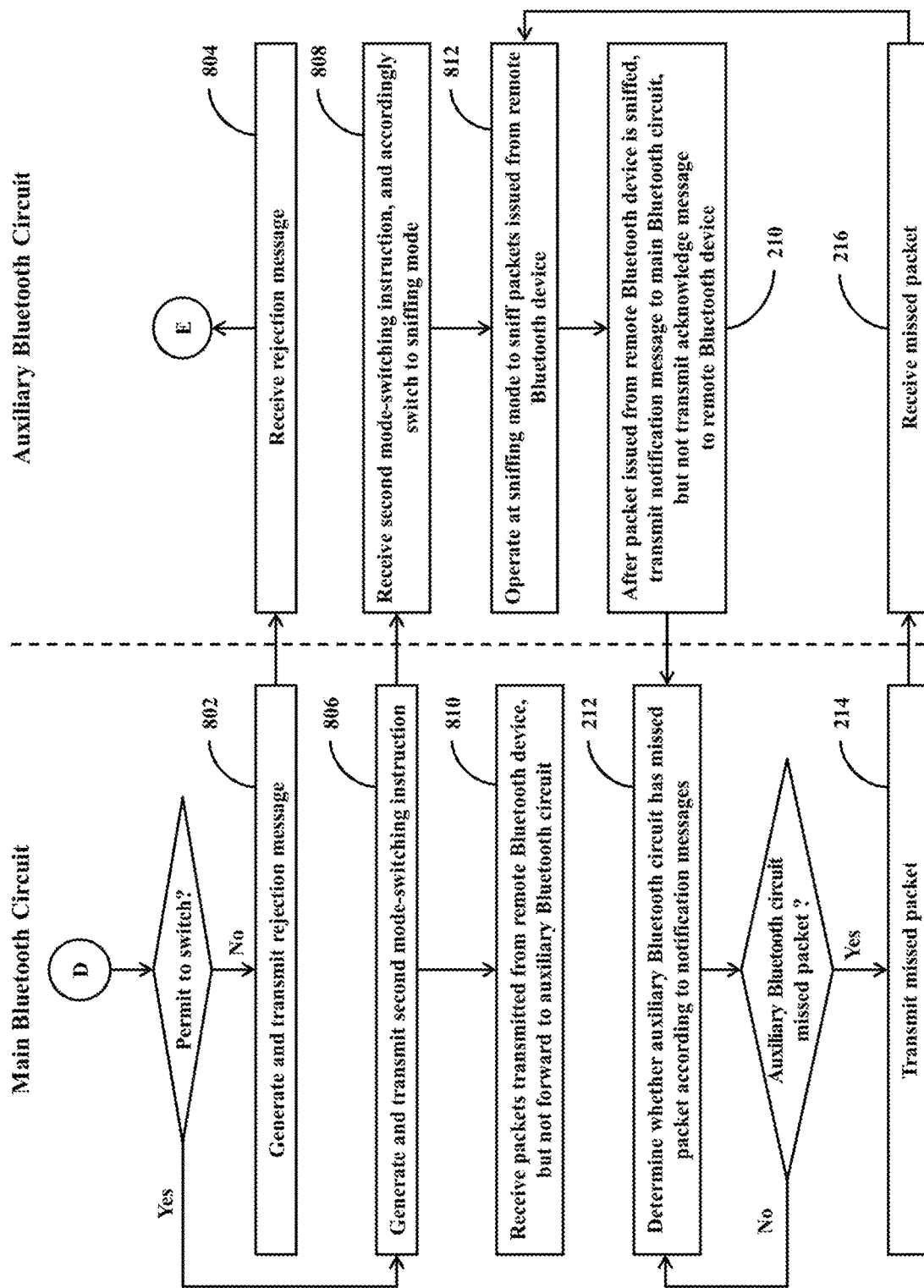

For example, FIGS. 7~8 collectively show a simplified flowchart of the operation method of the multi-member Bluetooth device 100 according to a fifth embodiment of the present disclosure.

As shown in FIG. 7, the multi-member Bluetooth device 100 may perform the aforementioned operation 202 first to acquire Bluetooth connection parameters for use in receiving the packets issued from the remote Bluetooth device 102. The foregoing descriptions regarding the operation approach and variations of the embodiment of the operation 202 in FIG. 2 are also applicable to the embodiment in FIG. 7.

For the convenience of description, it is similarly assumed hereinafter that the member circuit being currently selected among the member circuits of the multi-member Bluetooth device 100 to perform the major duty of receiving the packets issued from the remote Bluetooth device 102 is the first Bluetooth circuit 110, and each of the other member circuits (e.g., the aforementioned second Bluetooth circuit 120 and the third Bluetooth circuit 130) acts as an auxiliary Bluetooth circuit.

In the operation 704, through the first Bluetooth communication circuit 111, the first Bluetooth circuit 110 may inform other member circuits in the multi-member Bluetooth device 100 (e.g., the aforementioned second Bluetooth circuit 120 and third Bluetooth circuit 130) of that the first Bluetooth circuit 110 will play the role of the main Bluetooth circuit in the following stage, and may instruct each of other member circuits to play the role of the auxiliary Bluetooth circuit and to operate at the relay mode. That is, the first Bluetooth circuit 110 will perform the major operation of receiving the packets issued from the remote Bluetooth device 102 in the following stage, and other member circuits only need to receive the packets forwarded from the first Bluetooth circuit 110 and do not need to sniff the packets issued from the remote Bluetooth device 102, and other member circuits are not allowed to transmit instructions, data, or other related packets to the remote Bluetooth device 102.

Afterwards, in the period during which the auxiliary Bluetooth circuit operates at the relay mode, the first Bluetooth circuit 110 performs the operation 706.

In the operation 706, the first control circuit 117 of the first Bluetooth circuit 110 utilizes the first Bluetooth communication circuit 111 to receive the packets transmitted from the remote Bluetooth device 102, and the first control circuit 117 forwards the packets transmitted from the remote Bluetooth device 102 to other auxiliary Bluetooth circuits through the first Bluetooth communication circuit 111. For example, the first control circuit 117 may forward the packets transmitted from the remote Bluetooth device 102 to the second Bluetooth circuit 120 through the first Bluetooth communication circuit 111.

In operations, the first control circuit 117 may adopt the Bluetooth connection parameters acquired in the operation 202 to conduct packet transmission with the remote Bluetooth device 102 through the first Bluetooth communication circuit 111, so as to receive various packets transmitted from the remote Bluetooth device 102 or to transmit various packets to the remote Bluetooth device 102. As can be appreciated from the foregoing descriptions of the operation 202, the Bluetooth connection parameters adopted by the first Bluetooth circuit 110 in conducting packet transmission with the remote Bluetooth device 102 may be acquired by the first Bluetooth circuit 110 itself, or may be received from other member circuits (e.g., the second Bluetooth circuit 120).

As can be appreciated from the foregoing descriptions, the first Bluetooth circuit 110 and the remote Bluetooth device 102 may adopt various appropriate packet handshake mechanisms to reduce or avoid packet loss.

In the operation 708, the auxiliary Bluetooth circuit operates at the relay mode to receive the packets forwarded from the first Bluetooth circuit 110. For example, the second control circuit 127 may control the second Bluetooth circuit 120 to operate at the relay mode, and utilize the second Bluetooth communication circuit 121 to receive the packets forwarded from the first Bluetooth circuit 110. As can be appreciated from the foregoing descriptions, in the period during which the second Bluetooth circuit 120 operates at the relay mode, the second control circuit 127 does not utilize the second Bluetooth communication circuit 121 to sniff the packets issued from the remote Bluetooth device 102. In other words, in the period during which the second Bluetooth circuit 120 operates at the relay mode, the second Bluetooth circuit 120 indirectly acquires the packets issued from the remote Bluetooth device 102 through the first Bluetooth circuit 110.

As shown in FIG. 7, in the period during which the auxiliary Bluetooth circuit operates at the sniffing mode, the auxiliary Bluetooth circuit may further perform the operation 710 intermittently to calculate a signal reception quality indicator corresponding to a signal reception condition of its Bluetooth communication circuit. For example, the second control circuit 127 of the second Bluetooth circuit 120 may evaluate the current Bluetooth signal reception condition of the second Bluetooth communication circuit 121 to calculate a corresponding signal reception quality indicator in the operation 710. In practice, the aforementioned signal reception quality indicator may be realized with PER (packet error rate), BER (bit error rate), signal reception strength, QoS (quality of service), or other indicators capable of representing the current Bluetooth signal reception condition of the second Bluetooth communication circuit 121.

Then, the second control circuit 127 may perform the operation 712 to compare the aforementioned signal reception quality indicator with a predetermined indicator value.

If the signal reception quality indicator calculated by the second control circuit 127 is inferior to the predetermined indicator value, it means that the current wireless signal environment where the second Bluetooth circuit 120 conducts Bluetooth communication is not acceptable. In this situation, the second Bluetooth circuit 120 may continue to operate at the relay mode, and repeat the aforementioned operation 708 through the operation 712.

On the contrary, if the signal reception quality indicator calculated by the second control circuit 127 is superior to the predetermined indicator value, it means that the current wireless signal environment where the second Bluetooth circuit 120 conducts Bluetooth communication is acceptable. In this situation, the second Bluetooth circuit 120 may perform the operation 714.

In the operation 714, the second control circuit 127 generates a second mode-switching request, and transmits the second mode-switching request to the main Bluetooth circuit through the second Bluetooth communication circuit 121. The aforementioned second mode-switching request is utilized to request the main Bluetooth circuit to permit the second Bluetooth circuit 120 to switch from the relay mode to the sniffing mode. In practice, the second mode-switching request may be realized with various appropriate data formats.

In the operation 716, the first Bluetooth circuit 110 utilizes the first Bluetooth communication circuit 111 to receive the second mode-switching request transmitted from the second Bluetooth circuit 120.

In the operation 718, the first control circuit 117 of the first Bluetooth circuit 110 determines whether to permit the second Bluetooth circuit 120 to switch the operation mode. In this embodiment, after the first control circuit 117 receives the aforementioned second mode-switching request, the first control circuit 117 may determine whether to permit the second Bluetooth circuit 120 to switch the operation mode according to predetermined rules, and perform corresponding subsequent operations according to the determining results. If the first control circuit 117 determines not to permit the second Bluetooth circuit 120 to switch the operation mode, the first control circuit 117 would perform the operation 802 in FIG. 8. On the contrary, if the first control circuit 117 determines to permit the second Bluetooth circuit 120 to switch the operation mode, the first control circuit 117 would perform the operation 806 in FIG. 8.

The second Bluetooth circuit 120 is allowed to switch from the relay mode to the sniffing mode after the first Bluetooth circuit 110 permits the second Bluetooth circuit 120 to switch the operation mode, and in the following stage, the second Bluetooth circuit 120 sniffs the packets issued from the remote Bluetooth device 102 by itself, therefore the first Bluetooth circuit 110 does not need to forward the packets issued from the remote Bluetooth device 102 to the second Bluetooth circuit 120. As a result, it may increase the computing loading, power consumption, or heat generation of the second Bluetooth circuit 120, but it reduces the bandwidth requirement for data transmission between the first Bluetooth circuit 110 and the second Bluetooth circuit 120, and reduces the computing loading, power consumption, or heat generation of the first Bluetooth circuit 110.

Therefore, after receiving the aforementioned second mode-switching request, the first control circuit 117 may evaluate if there exist any reasons showing that it is not suitable for the second Bluetooth circuit 120 to switch the operation mode at the time being. If not, then the first control circuit 117 may permit the second Bluetooth circuit 120 to switch the operation mode. For example, the first control circuit 117 may permit the second Bluetooth circuit 120 to switch the operation mode if the current computing loading of the second Bluetooth circuit 120 is below a predetermined level, the remaining power of the second Bluetooth circuit 120 exceeds a predetermined threshold, and/or the temperature of the second Bluetooth circuit 120 is lower than a predetermined temperature. For another example, the first control circuit 117 may permit the second Bluetooth circuit 120 to switch the operation mode only if the current computing loading of the first Bluetooth circuit 110 is above a predetermined level, the remaining power of the first Bluetooth circuit 110 is below a predetermined threshold, and/or the temperature of the first Bluetooth circuit 110 is higher than a predetermined temperature.

In the operation 802, the first control circuit 117 generates a rejection message which represents that the first Bluetooth circuit 110 does not permit the second Bluetooth circuit 120 to switch the operation mode, and transmits the rejection message to the second Bluetooth circuit 120 through the first Bluetooth communication circuit 111.

In the operation 804, the second Bluetooth circuit 120 utilizes the second Bluetooth communication circuit 121 to receive the rejection message transmitted from the first Bluetooth circuit 110. In this situation, the second control circuit 127 controls the second Bluetooth circuit 120 to continue to operate at the relay mode according to the instruction of the rejection message and repeat the aforementioned operation 708 through the operation 712.

In the operation 806, the first control circuit 117 of the first Bluetooth circuit 110 generates a second mode-switching instruction for instructing the second Bluetooth circuit 120 to switch from the relay mode to the sniffing mode, and transmits the second mode-switching instruction to the second Bluetooth circuit 120 through the first Bluetooth communication circuit 111.

In the operation 808, the second Bluetooth communication circuit 121 receives the second mode-switching instruction transmitted from the first Bluetooth circuit 110, and the second control circuit 127 switches the operation mode of the second Bluetooth circuit 120 from the relay mode to the sniffing mode according to the second mode-switching instruction.

Afterwards, the first Bluetooth circuit 110 performs the operation 810, and the second Bluetooth circuit 120 performs the operation 812.

In the operation 810, the first control circuit 117 of the first Bluetooth circuit 110 utilizes the first Bluetooth communication circuit 111 to receive the packets transmitted from the remote Bluetooth device 102, but the first control circuit 117 does not forward the packets transmitted from the remote Bluetooth device 102 to the second Bluetooth circuit 120 through the first Bluetooth communication circuit 111.

In the operation 812, the second control circuit 127 of the second Bluetooth circuit 120 may utilize the second Bluetooth communication circuit 121 to sniff the packets issued from the remote Bluetooth device 102 according to the Bluetooth connection parameters acquired in the operation 202. In one embodiment, the second Bluetooth communication circuit 121 may sniff all of the Bluetooth packets issued from the remote Bluetooth device 102. In another embodiment, the second Bluetooth communication circuit 121 only sniffs the Bluetooth packets transmitted from the remote Bluetooth device 102 to the first Bluetooth circuit 110, but does not sniff the Bluetooth packets transmitted from the remote Bluetooth device 102 to devices other than the multi-member Bluetooth device 100. As can be appreciated from the foregoing descriptions of the operation 202, the Bluetooth connection parameters adopted by the second Bluetooth communication circuit 121 in sniffing the packets issued from the remote Bluetooth device 102 may be acquired by the second Bluetooth circuit 120 itself, or may be received from other member circuits (e.g., the first Bluetooth circuit 110).

Afterwards, the multi-member Bluetooth device 100 may perform the aforementioned operation 210 through operation 216 in FIG. 2.

Please note that the aforementioned operation approach that the first control circuit 117 first performs the determination procedure of the operation 718 and then performs the operation 806 after determining that it is suitable to permit the second Bluetooth circuit 120 to switch the operation mode is merely an example embodiment, rather than a restriction to the practical implementations. In practice, the first control circuit 117 may skip the aforementioned determination procedure of the operation 718 and directly proceed to perform the operation 806 after receiving the aforementioned second mode-switching request.

As can be appreciated from the foregoing descriptions, in the period during which the second Bluetooth circuit 120 which plays the role of the auxiliary Bluetooth circuit operates at the relay mode, the second Bluetooth circuit 120 intermittently compares the signal reception quality indicator corresponding to the second Bluetooth communication circuit 121 with the predetermined indicator value to evaluate whether the current Bluetooth signal reception environment of the second Bluetooth communication circuit 121 has obviously improved. If the signal reception quality indicator of the second Bluetooth communication circuit 121 is inferior to the aforementioned predetermined indicator value, that is, the current wireless signal environment where the second Bluetooth circuit 120 conducts Bluetooth communication is unacceptable, the first Bluetooth circuit 110 which plays the role of the main Bluetooth circuit would not instruct the second Bluetooth circuit 120 to switch to the sniffing mode so as to prevent the second Bluetooth circuit 120 from wasting operating sources and power on ineffective packet sniffing operation.

The first Bluetooth circuit 110 instructs the second Bluetooth circuit 120 to switch the operation mode from the relay mode to the sniffing mode only if the signal reception quality indicator of the second Bluetooth communication circuit 121 is superior to the aforementioned predetermined indicator value, that is, the Bluetooth wireless signal environment of the second Bluetooth circuit 120 becomes to be acceptable. In this situation, the first Bluetooth circuit 110 only needs to transmit the packets missed by the second Bluetooth circuit 120 to the second Bluetooth circuit 120, and does not need to forward all of the packets issued from the remote Bluetooth device 102 to the second Bluetooth circuit 120, thus the operating burden, power consumption, and heat generation of the first Bluetooth circuit 110 can be reduced, the serving time and the standby time of the first Bluetooth circuit 110 can be extended, and the bandwidth requirement for data transmission between the first Bluetooth circuit 110 and the second Bluetooth circuit 120 can be reduced.

Similarly, the multi-member Bluetooth device 100 may dynamically switch the operation mode of the third Bluetooth circuit 130 according to the throughput of packets sniffed by the third Bluetooth circuit 130 as elaborated above.

Accordingly, by adopting the operation approach of aforementioned FIG. 7 and FIG. 8, the main Bluetooth circuit of the multi-member Bluetooth device 100 may dynamically switch the operation mode of the auxiliary Bluetooth circuit from the relay mode to the sniffing mode, and adaptively adjust the cooperation between the main Bluetooth circuit and the auxiliary Bluetooth circuit. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Figure 9:
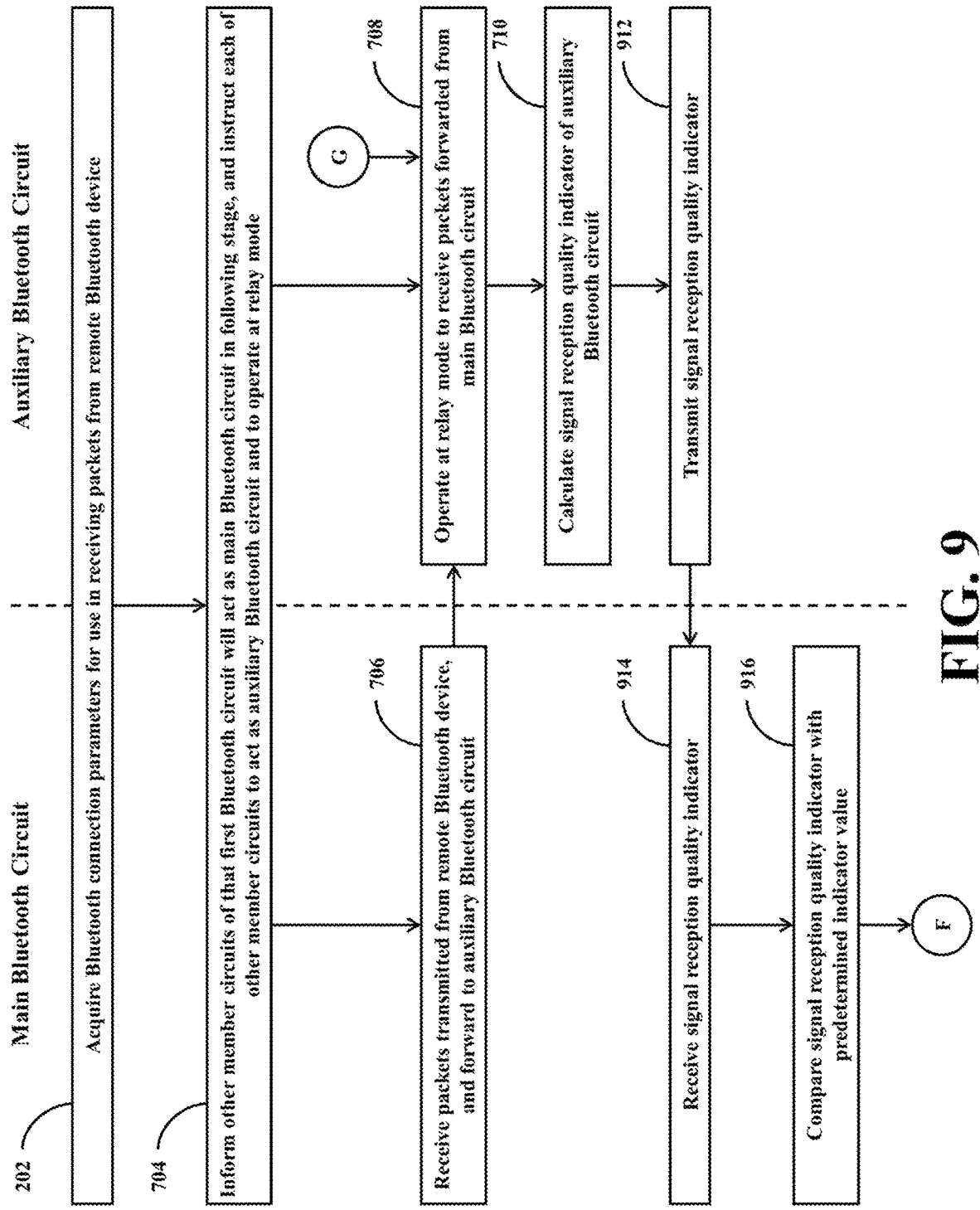
FIGS. 9~10 collectively show a simplified flowchart of the operation method of the multi-member Bluetooth device according to a sixth embodiment of the present disclosure.
Figure 10:
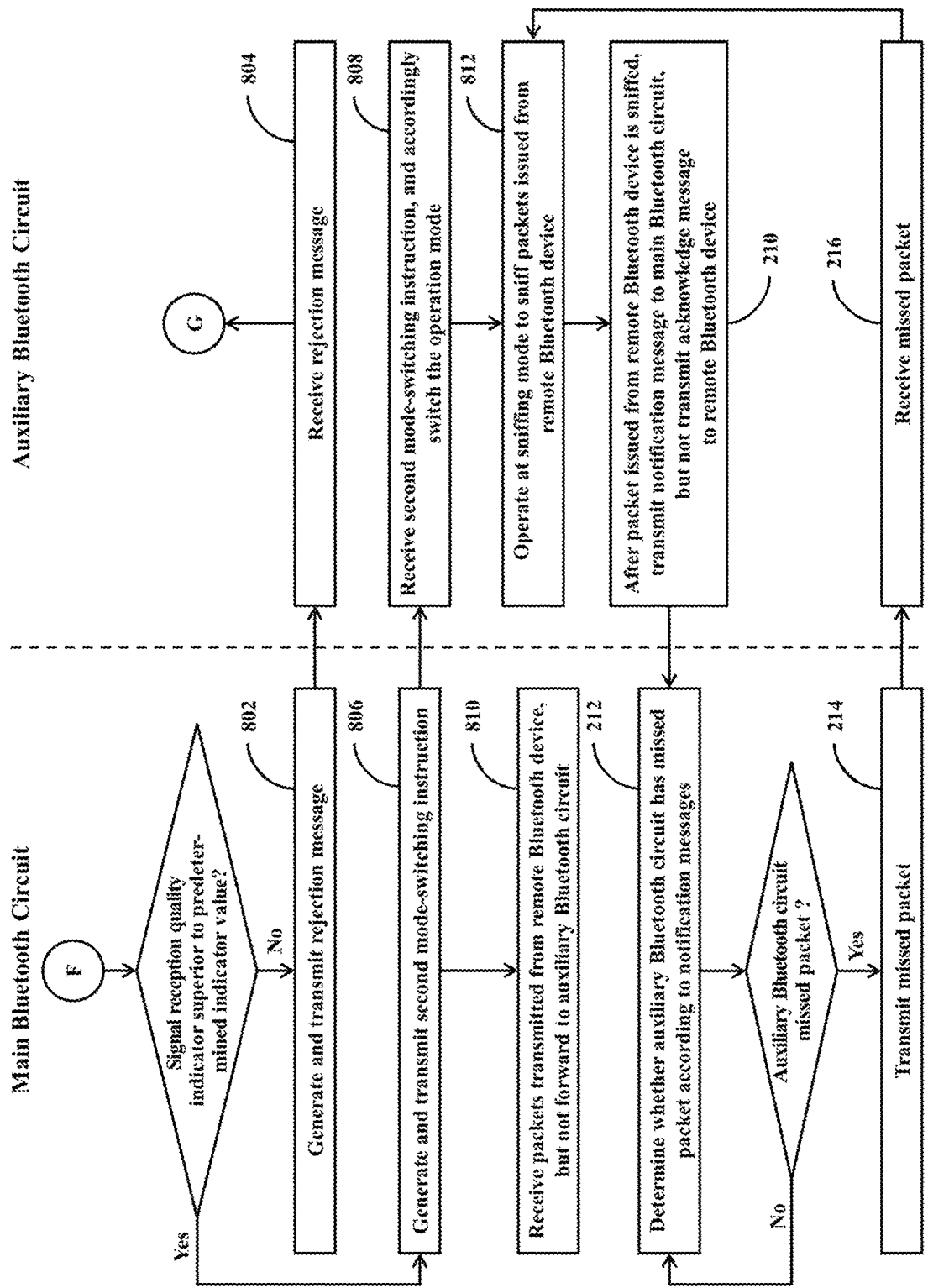

Please refer to FIG. 9 through FIG. 10, which collectively show a simplified flowchart of the operation method of the multi-member Bluetooth device 100 according to a sixth embodiment of the present disclosure.

In the embodiment of FIG. 9 and FIG. 10, in the period during which the auxiliary Bluetooth circuit operates at the relay mode, the auxiliary Bluetooth circuit performs the operation 710 intermittently to calculate a signal reception quality indicator corresponding to a signal reception condition of its Bluetooth communication circuit. However, after the auxiliary Bluetooth circuit of this embodiment performs the operation 710, the auxiliary Bluetooth circuit does not perform the aforementioned operation 712 but performs the operation 912 in FIG. 9 to transmit the signal reception quality indicator calculated by the auxiliary Bluetooth circuit itself to the main Bluetooth circuit.

For example, after the second Bluetooth circuit 120 calculates the aforementioned signal reception quality indicator in the operation 710, the second Bluetooth circuit 120 performs the operation 912. In this situation, the second control circuit 127 transmits the signal reception quality indicator to the first Bluetooth circuit 110 through the second Bluetooth communication circuit 121.

In the operation 914, the first Bluetooth circuit 110 utilizes the first Bluetooth communication circuit 111 to receive the signal reception quality indicator transmitted from the second Bluetooth circuit 120.

Then, the first control circuit 117 performs the operation 916 to compare the signal reception quality indicator calculated by the second Bluetooth circuit 120 with a predetermined indicator value.

If the signal reception quality indicator calculated by the second control circuit 127 is inferior to the predetermined indicator value, it means that the current wireless signal environment where the second Bluetooth circuit 120 conducts Bluetooth communication is unacceptable. In this situation, the first Bluetooth circuit 110 may perform the operation 802 in FIG. 10.

On the contrary, if the signal reception quality indicator calculated by the second control circuit 127 is superior to the predetermined indicator value, it means that the current wireless signal environment where the second Bluetooth circuit 120 conducts Bluetooth communication is acceptable. In this situation, the first Bluetooth circuit 110 may perform the operation 806 in FIG. 10.

In the operation 806, the first control circuit 117 of the first Bluetooth circuit 110 generates a second mode-switching instruction for instructing the second Bluetooth circuit 120 to switch from the relay mode to the sniffing mode, and transmits the second mode-switching instruction to the second Bluetooth circuit 120 through the first Bluetooth communication circuit 111.

In the operation 808, the second Bluetooth communication circuit 121 receives the second mode-switching instruction transmitted from the first Bluetooth circuit 110, and the second control circuit 127 switches the operation mode of the second Bluetooth circuit 120 from the relay mode to the sniffing mode according to the second mode-switching instruction.

Afterwards, the first Bluetooth circuit 110 performs the operation 810, and the second Bluetooth circuit 120 performs the operation 812.

In the operation 810, the first control circuit 117 utilizes the first Bluetooth communication circuit 111 to receive the packets transmitted from the remote Bluetooth device 102, but the first control circuit 117 does not forward the packets transmitted from the remote Bluetooth device 102 to the second Bluetooth circuit 120 through the first Bluetooth communication circuit 111.

In the operation 812, the second control circuit 127 may utilize the second Bluetooth communication circuit 121 to sniff the packets issued from the remote Bluetooth device 102 according to the Bluetooth connection parameters acquired in the operation 202.

Afterwards, the multi-member Bluetooth device 100 may perform the aforementioned operation 210 through operation 216 in FIG. 2.

Many operations in FIG. 10 are similar to operations of the aforementioned embodiment in FIG. 8, thus the foregoing descriptions regarding the operation approach and variations of the embodiment of the corresponding operations in FIG. 8 are also applicable to the embodiment in FIG. 10.

As can be appreciated from the foregoing descriptions, in the period during which the second Bluetooth circuit 120 operates at the relay mode, the first Bluetooth circuit 110 of this embodiment intermittently compares the signal reception quality indicator corresponding to the second Bluetooth communication circuit 121 with the predetermined indicator value to evaluate whether the current Bluetooth signal reception environment of the second Bluetooth communication circuit 121 has obviously improved. If the signal reception quality indicator of the second Bluetooth communication circuit 121 is inferior to the aforementioned predetermined indicator value, that is, the current wireless signal environment where the second Bluetooth circuit 120 conducts Bluetooth communication is unacceptable, the first Bluetooth circuit 110 which plays the role of the main Bluetooth circuit would not instruct the second Bluetooth circuit 120 to switch to the sniffing mode so as to prevent the second Bluetooth circuit 120 from wasting operating sources and power on ineffective packet sniffing operation.

The first Bluetooth circuit 110 instructs the second Bluetooth circuit 120 to switch the operation mode from the relay mode to the sniffing mode only if the signal reception quality indicator of the second Bluetooth communication circuit 121 is superior to the aforementioned predetermined indicator value, that is, the Bluetooth wireless signal environment of the second Bluetooth circuit 120 becomes to be acceptable. In this situation, the first Bluetooth circuit 110 only needs to transmit the packets missed by the second Bluetooth circuit 120 to the second Bluetooth circuit 120, and does not need to forward all of the packets issued from the remote Bluetooth device 102 to the second Bluetooth circuit 120, thus the operating burden, power consumption, and heat generation of the first Bluetooth circuit 110 can be reduced, the serving time and the standby time of the first Bluetooth circuit 110 can be extended, and the bandwidth requirement for data transmission between the first Bluetooth circuit 110 and the second Bluetooth circuit 120 can be reduced.

Similarly, the multi-member Bluetooth device 100 may dynamically switch the operation mode of the third Bluetooth circuit 130 according to the throughput of packets sniffed by the third Bluetooth circuit 130 as elaborated above.

Accordingly, by adopting the operation approach of aforementioned FIG. 9 and FIG. 10, the main Bluetooth circuit of the multi-member Bluetooth device 100 may dynamically switch the operation mode of the auxiliary Bluetooth circuit from the relay mode to the sniffing mode, and adaptively adjust the cooperation between the main Bluetooth circuit and the auxiliary Bluetooth circuit. Therefore, the multi-member Bluetooth device 100 is capable of achieving various management mechanisms, such as load balancing, power consumption balancing, or heat generation balancing among the multiple member circuits, thereby improving the overall performance of the multi-member Bluetooth device 100, increasing the service life of the Bluetooth circuit, or improving the user experiences.

Please note that the quantity of the member circuits in the multi-member Bluetooth device 100 in each of the foregoing embodiments may be reduced to two, or may be increased depending on the requirement of practical circuit applications.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" phrases "be coupled with," "couples with," and "coupling with" are is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multi-member Bluetooth device (100) utilized to operably conduct data transmission with a remote Bluetooth device (102), the multi-member Bluetooth device (100) comprising:
 a min Bluetooth circuit (110), comprising:
  a first Bluetooth communication circuit (111);
  a first packet parsing circuit (113), arranged to operably parse packets received by the first Bluetooth communication circuit (111); and
  a first control circuit (117), coupled with the first Bluetooth communication circuit (111) and the first packet parsing circuit (113); and
 an auxiliary Bluetooth circuit (120), arranged to selectably operate at a sniffing mode or a relay mode, the auxiliary Bluetooth circuit (120) comprising:
  a second Bluetooth communication circuit (121);
  a second packet parsing circuit (123), arranged to operably parse packets received by the second Bluetooth communication circuit (121); and
  a second control circuit (127), coupled with the second Bluetooth communication circuit (121) and the second packet parsing circuit (123);
 wherein in a period during which the auxiliary Bluetooth circuit (120) operates at the sniffing mode, the first control circuit (117) utilizes the first Bluetooth communication circuit (111) to receive packets transmitted from the remote Bluetooth device (102), and the second control circuit (127) utilizes the second Bluetooth communication circuit (121) to sniff packets issued from the remote Bluetooth device (102);
 in a situation of that a throughput of packets sniffed by of the auxiliary Bluetooth circuit (120) is lower than a predetermined threshold, the auxiliary Bluetooth circuit (120) switches from the sniffing mode to the relay mode; and
 in a period during which the auxiliary Bluetooth circuit (120) operates at the relay mode, the second control circuit (127) does not utilize the second Bluetooth communication circuit (121) to sniff packets issued from the remote Bluetooth device (102), the first control circuit (117) utilizes the first Bluetooth communication circuit (111) to receive packets transmitted from the remote Bluetooth device (102), and utilizes the first Bluetooth communication circuit (111) to forward received packets to the auxiliary Bluetooth circuit (120), and the second control circuit (127) utilizes the second Bluetooth communication circuit (121) to receive packets forwarded from the first Bluetooth communication circuit (111);
 wherein in a period during which the auxiliary Bluetooth circuit (120) operates at the sniffing mode, the first control circuit (117) is further arranged to operably transmit packets issued from the remote Bluetooth device (102) but missed by the second Bluetooth communication circuit (121) to the second Bluetooth communication circuit (121) through the first Bluetooth communication circuit (111);
 wherein in a period during which the auxiliary Bluetooth circuit (120) operates at the sniffing mode, the first control circuit (117) calculates the throughput according to a frequency of that the first control circuit (117) transmits missed packets to the second Bluetooth communication circuit (121) through the first Bluetooth communication circuit (111), and the first control circuit (117) transmits the throughput to the second Bluetooth communication circuit (121) through the first Bluetooth communication circuit (111), and the second control circuit (127) is further arranged to operably compare the throughput with the predetermined threshold;

wherein if the throughput is lower than the predetermined threshold, the second control circuit (127) transmits a mode-switching request to the first Bluetooth communication circuit (111) through the second Bluetooth communication circuit (121) so as to request the main Bluetooth circuit (110) to permit the auxiliary Bluetooth circuit (120) to switch from the sniffing mode to the relay mode.

2. The multi-member Bluetooth device (100) of claim 1, wherein the first control circuit (117) or the second control circuit (127) calculates the throughput, and the first control circuit (117) or the second control circuit (127) compares the throughput with the predetermined threshold.

3. A multi-member Bluetooth device (100) utilized to operably conduct data transmission with a remote Bluetooth device (102), the multi-member Bluetooth device (100) comprising:
- a main Bluetooth circuit (110), comprising:
  - a first Bluetooth communication circuit (111);
  - a first packet parsing circuit (113), arranged to operably parse packets received by the first Bluetooth communication circuit (111); and
  - a first control circuit (117), coupled with the first Bluetooth communication circuit (111) and the first packet parsing circuit (113); and
- an auxiliary Bluetooth circuit (120), arranged to selectably operate at a sniffing mode or a relay mode, the auxiliary Bluetooth circuit (120) comprising:
  - a second Bluetooth communication circuit (121);
  - a second packet parsing circuit (123), arranged to operably parse packets received by the second Bluetooth communication circuit (121); and
  - a second control circuit (127), coupled with the second Bluetooth communication circuit (121) and the second packet parsing circuit (123);
- wherein in a period during which the main Bluetooth circuit (110) and the auxiliary Bluetooth circuit (120) do not exchange their roles with each other, and the auxiliary Bluetooth circuit (120) operates at the sniffing mode, the first control circuit (117) utilizes the first Bluetooth communication circuit (111) to receive packets transmitted from the remote Bluetooth device (102), and the second control circuit (127) utilizes the second Bluetooth communication circuit (121) to sniff packets issued from the remote Bluetooth device (102);
- in a situation of that a throughput of packets sniffed by of the auxiliary Bluetooth circuit (120) is lower than a predetermined threshold, the auxiliary Bluetooth circuit (120) switches from the sniffing mode to the relay mode, but the main Bluetooth circuit (110) and the auxiliary Bluetooth circuit (120) do not exchange their roles with each other; and
- in a period during which the main Bluetooth circuit (110) and the auxiliary Bluetooth circuit (120) do not exchange their roles with each other, and the auxiliary Bluetooth circuit (120) operates at the relay mode, the second control circuit (127) does not utilize the second Bluetooth communication circuit (121) to sniff packets issued from the remote Bluetooth device (102), the first control circuit (117) utilizes the first Bluetooth communication circuit (111) to receive packets transmitted from the remote Bluetooth device (102), and utilizes the first Bluetooth communication circuit (111) to forward received packets to the auxiliary Bluetooth circuit (120), and the second control circuit (127) utilizes the second Bluetooth communication circuit (121) to receive packets forwarded from the first Bluetooth communication circuit (111).

4. The multi-member Bluetooth device (100) of claim 3, wherein the first control circuit (117) or the second control circuit (127) calculates the throughput, and the first control circuit (117) or the second control circuit (127) compares the throughput with the predetermined threshold.

5. The multi-member Bluetooth device (100) of claim 4, wherein the second control circuit (127) is further arranged to operably calculate the throughput, and arranged to operably compare the throughput with the predetermined threshold;

wherein if the throughput is lower than the predetermined threshold, the second control circuit (127) transmits a mode-switching request to the first Bluetooth communication circuit (111) through the second Bluetooth communication circuit (121) so as to request the main Bluetooth circuit (110) to permit the auxiliary Bluetooth circuit (120) to switch from the sniffing mode to the relay mode.

6. The multi-member Bluetooth device (100) of claim 4, wherein the second control circuit (127) is further arranged to operably calculate the throughput, and arranged to operably transmit the throughput to the first Bluetooth communication circuit (111) through the second Bluetooth communication circuit (121), and the first control circuit (117) is further arranged to operably compare the throughput with the predetermined threshold;

wherein if the throughput is lower than the predetermined threshold, the first control circuit (117) transmits a mode-switching instruction to the second Bluetooth communication circuit (121) through the first Bluetooth communication circuit (111) so as to instruct the auxiliary Bluetooth circuit (120) to switch from the sniffing mode to the relay mode.

7. The multi-member Bluetooth device (100) of claim 4, wherein in a period during which the auxiliary Bluetooth circuit (120) operates at the sniffing mode, the first control circuit (117) is further arranged to operably transmit packets issued from the remote Bluetooth device (102) but missed by the second Bluetooth communication circuit (121) to the second Bluetooth communication circuit (121) through the first Bluetooth communication circuit (111).

8. The multi-member Bluetooth device (100) of claim 7, wherein in a period during which the auxiliary Bluetooth circuit (120) operates at the sniffing mode, the first control circuit (117) calculates the throughput according to a frequency of that the first control circuit (117) transmits missed packets to the second Bluetooth communication circuit (121) through the first Bluetooth communication circuit (111), and compares the throughput with the predetermined threshold;

wherein if the throughput is lower than the predetermined threshold, the first control circuit (117) transmits a mode-switching instruction to the second Bluetooth communication circuit (121) through the first Bluetooth communication circuit (111) so as to instruct the auxiliary Bluetooth circuit (120) to switch from the sniffing mode to the relay mode.

9. The multi-member Bluetooth device (100) of claim 7, wherein in a period during which the auxiliary Bluetooth circuit (120) operates at the sniffing mode, the first control circuit (117) calculates the throughput according to a frequency of that the first control circuit (117) transmits missed packets to the second Bluetooth communication circuit (121) through the first Bluetooth communication circuit (111), and the first control circuit (117) transmits the throughput to the second Bluetooth communication circuit (121) through the first Bluetooth communication circuit (111), and the second control circuit (127) is further arranged to operably compare the throughput with the predetermined threshold;

wherein if the throughput is lower than the predetermined threshold, the second control circuit (127) transmits a mode-switching request to the first Bluetooth communication circuit (111) through the second Bluetooth communication circuit (121) so as to request the main Bluetooth circuit (110) to permit the auxiliary Bluetooth circuit (120) to switch from the sniffing mode to the relay mode.

\* \* \* \* \*